(12) United States Patent
Fukumoto et al.

(10) Patent No.: US 6,380,923 B1
(45) Date of Patent: Apr. 30, 2002

(54) FULL-TIME WEARABLE INFORMATION MANAGING DEVICE AND METHOD FOR THE SAME

(75) Inventors: Masaaki Fukumoto, Yokohama; Akira Hiraiwa; Tadasu Uchiyama, both of Yokosuka; Noboru Sonehara, Zushi, all of (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 08/298,552

(22) Filed: Aug. 30, 1994

(30) Foreign Application Priority Data

Aug. 31, 1993 (JP) .............................. 5-215421
Jul. 6, 1994 (JP) .............................. 6-154605

(51) Int. Cl.⁷ .............................................. G09G 5/00
(52) U.S. Cl. ...................................... 345/156; 341/22
(58) Field of Search .................... 84/600, 626, 719, 84/718, 720, 730, 744, 616; 345/156, 157, 168, 169; 341/22

(56) References Cited

U.S. PATENT DOCUMENTS

| 4,542,291 A | * | 9/1985 | Zimmerman |
| 5,029,508 A | * | 7/1991 | Suzuki et al. .................. 84/616 |
| 5,047,952 A | * | 9/1991 | Kramer et al. |
| 5,125,313 A | * | 6/1992 | Hiyoshi et al. ........... 84/626 X |
| 5,144,594 A | * | 9/1992 | Gilchrist |
| 5,166,463 A | * | 11/1992 | Weber .......................... 84/600 |
| 5,184,009 A | * | 2/1993 | Wright et al. |
| 5,184,319 A | * | 2/1993 | Kramer ....................... 345/156 |
| 5,489,922 A | * | 2/1996 | Zloof .......................... 345/156 |
| 5,581,484 A | * | 12/1996 | Prince ......................... 341/22 |

OTHER PUBLICATIONS

T. G. Zimmerman et al, "A Hand Gesture Interface Device," CHI+GI 1987, pp. 189–192.*

* cited by examiner

Primary Examiner—Amare Mengistu
(74) Attorney, Agent, or Firm—Finnegan, Henderson & Farabow, Garrett & Dunner LLP

(57) ABSTRACT

A full-time wearable input device, method for the same is provided, wherein the immediate accessibility is improved without sacrificing the operational integrity, and information can be inputted anytime, anywhere, and immediately. The full-time wearable input device comprises a detector for detecting the shock generated at the time of striking the fingertips against a physical surface, and an analyzer for analyzing the timing at which the fingertips strike the aforementioned physical surface and determining the input information based on the detection signal detected by the aforementioned detector. As the above-mentioned detector, a shock sensor, acceleration sensor, sound sensor and myoelectric sensor can be used. The input information is then determined based on the change in the shock, acceleration, sound and/or myoelectric potential as detected by the sensors which are worn on each finger, wrist, or arm.

19 Claims, 33 Drawing Sheets

LD EMISSION CHARACTERISTICS

FL TRANSMISSION CHARACTERISTICS

PD CHARACTERISTICS OF LIGHT RECEIVED ( I )

PD CHARACTERISTICS OF LIGHT RECEIVED ( II )

FINGER TYPING PATTERN          CHORD PATTERN

⇒ 【12203】

| CHORD PATTERN | OUTPUT CODE |
|---|---|
| 【10000】 | 'A' |
| 【01100】 | 'B' |
| 【01020】 | 'C' |
| 【12203】 | 'D' |
| ⋮ | ⋮ |

FIG.36

| TIME | NOTE | FINGERING | | |
|---|---|---|---|---|
| | | PRECISE | SIMPLE | ONE FINGER |
| 1 | C | 1 | 1 2 | * |
| 2 | D | 2 | > | * |
| 3 | E | 3 | > | * |
| 4 | F | 4 | > | * |
| 5 | E | 3 | < | * |
| 6 | D | 2 | < | * |
| 7 | C | 1 | < | * |

FULL-TIME WEARABLE INFORMATION MANAGING DEVICE AND METHOD FOR THE SAME

BACKGROUND OF THE INVENTION

1. Field of the Invention

The present invention relates to a full-time wearable input device and method for the same which can perform input operations such as character input and menu selection anywhere, anytime, and in any situation. The present invention also relates to an information managing device achieved by adapting the aforementioned full-time wearable input device.

2. Relevant Art

The main objective of a portable information device is to be able to conduct input, referencing and processing of information at anywhere, anytime and immediately. Most portable information devices have a pocketbook shape and must be manually withdrawn from a pocket or bag at the time of use. However, since this type of device must be extracted for use, it does not provide the user the opportunity for immediate operation.

In contrast, a portable information device of the kind worn on the body offers the user the advantage of immediate operation without having to withdraw the device from a pocket, bag or the like. In addition, it is also possible to obtain similar results by attaching an input/output interface device to the body, and storing the base of the information device in a bag or pocket.

Previously, without being limited to only the input devices of portable information systems, keyboards and keypads have been principally used as input devices for character input, menu selection, and the like.

With regard to these conventional keyboards in which the key switches are lined up, it is extremely difficult to achieve miniaturization while maintaining the operation integrity therein. When considering a wearable key input device, a "virtual keyboard" which conducts input by directly detecting the movement of the fingers without the use of key switches is necessary. Conventional "virtual keyboards" are known, such as (1) a device in which tactile and/or pressure sensors are installed in the fingertip portions of a glove or finger sacks (see Japanese Pat. Application, First Publication, No. Sho 63-126928, and Japanese Utility Model No. Sho 63-199327);

(2) a device in which measures the angles of each finger joint and the palm of the hand by means of optical fibers and resistance fibers contained in the glove (see U.S. Pat. No. 4,937,444 and U.S. Pat. No. 5,079,252; data glove produced by VPL Research Co., Ltd.).

It is necessary for a full-time wearable input device to be attached to or worn on the body at all times and by means of its portable nature not serve as a hindrance during daily life. In the aforementioned (1) above, a virtual keyboard is realized which detects tapping of the fingers on a physical body such as a desk by means of sensor output from tactile, pressure, magnetic, and/or electrical field sensors installed in the finger sacks or fingertip portions of a glove. However, by means of this mechanism, the fingertip, which has the highest sensitivity of any human tactile sense organ, is enveloped by the aforementioned glove or finger sacks thereby hindering full-time wearable usage.

The mechanism of (2) explained above aligns optical fibers and resistance fibers along each finger joint and then measures the angle of the joints from the change in the light transmittance and resistance.

Consequently, by applying a glove-shaped device, the fingertip portions can be exposed. However, by means of the same mechanism, since only the change in the angle of the joints is detected, it is difficult to distinguish between finger actions in the case of performing key input on a physical body such as a table, desk, or the like, and the bending action of the fingers in midair when a typing surface does not exist. In addition, due to the minute actions of the fingers during high-speed key-typing, it is difficult to extract the key typing action from only the change in the bending angle.

SUMMARY OF THE INVENTION

In consideration of the aforementioned, it is an object of the present invention to provide a full-time wearable input device, method for the same, and practical application of the aforementioned input device in which the highly sensitive fingertip remains uncovered, and key-typing action can be detected on any surface such as a desk or the like.

Hence, the present invention provides a full-time wearable input device for performing information input by means of striking a physical surface with fingertips, the full-time wearable input device comprising: a detecting means for detecting a shock generated at the time when a fingertip strikes a physical surface; and an analyzing means for analyzing the timing at which the fingertip strikes the physical surface based on a detection signal outputted from the detector and for determining an input information.

In addition, the present invention provides an information input method for performing input of information from the striking of a finger tip against a physical surface, the information input method comprising the steps of: detecting shock generated at the time of striking a finger tip against a physical surface in a first step; and analyzing the timing at which the finger tip strikes the physical surface based on a detection result, and determining input information in a second step.

As the above-mentioned detecting means, a shock sensor, acceleration sensor, sound sensor and myoelectric sensor can be used. The input information is then determined based on the change in the shock, acceleration, sound and/or myoelectric potential as detected by the sensors which are worn on each finger, wrist, or arm. In addition, the input information can be determined based on which finger struck the physical surface, which combination of fingers struck the physical surface, or from the order in which the fingers (or combinations therein) struck the surface over a short period of time.

Furthermore, it is also possible to provide a transmitter for transmitting to the analyzer the detection signal outputted by the detecting means via electromagnetic waves or sound waves. Consequently, according to the present invention, the mobility and immediate accessibility are improved without sacrificing the operational integrity, and input such as menu selection and character input can be accomplished anytime, anywhere, and immediately. In addition, by means of employing the full-time wearable input device according to the present invention as an input device of a full-time wearable communication apparatus, conversation with partners becomes possible anytime, anywhere and immediately, which in particular is useful for the interaction of the speech-impaired. Furthermore, by employing the full-time wearable input device according to the present invention as an input device of a full-time wearable musical keyboard apparatus, it is possible to perform/play music, anytime, anywhere and immediately.

Finally, by employing the full-time wearable input device according to the present invention as an input device of full-time wearable Braille input/output apparatus, it is possible for a visually-and/or hearing-impaired operator to input Braille at anytime, anywhere and immediately without having to undergo any special training.

BRIEF DESCRIPTION OF THE DRAWINGS

FIG. 33 shows a situation in which a full-time wearable communication apparatus according to an Eighth Embodiment of the present invention is connected to an external machine such as a public telephone or the like.

FIG. 36 shows an example of a fingering table according to a Ninth Embodiment of the present invention.

DETAILED DESCRIPTION OF THE INVENTION

Figure 1:
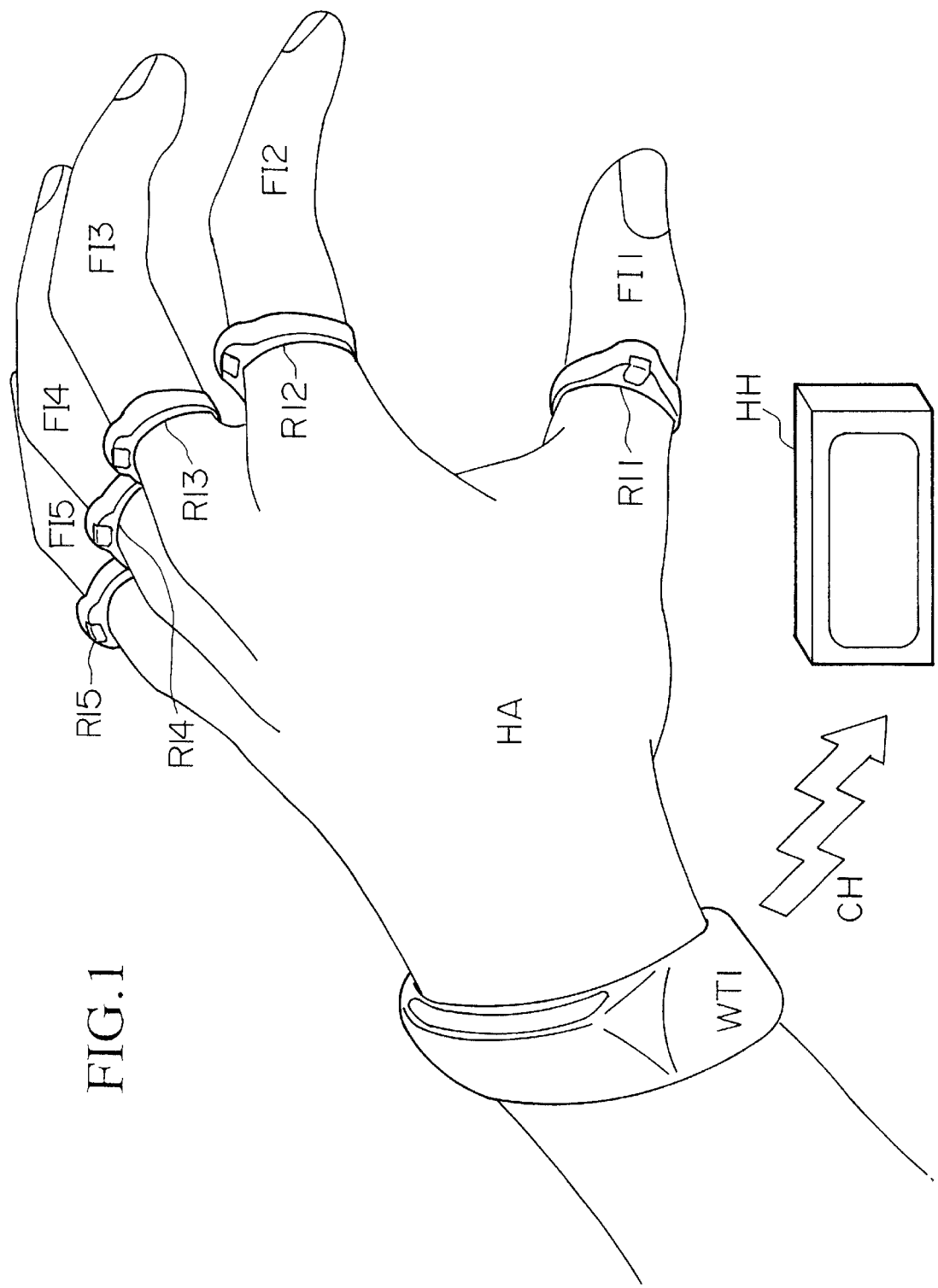
FIG. 1 shows a full-time wearable input device according to a First Embodiment of the present invention in the case when worn on a left hand.

In the following, the embodiments of the present invention will be described in detail with reference to the figures.

Furthermore, in all Figs. used in explaining the embodiments, structures with the same function will be denoted by the same reference numeral, and a repetition of their explanations will be omitted.

[First Embodiment]

Figure 2:
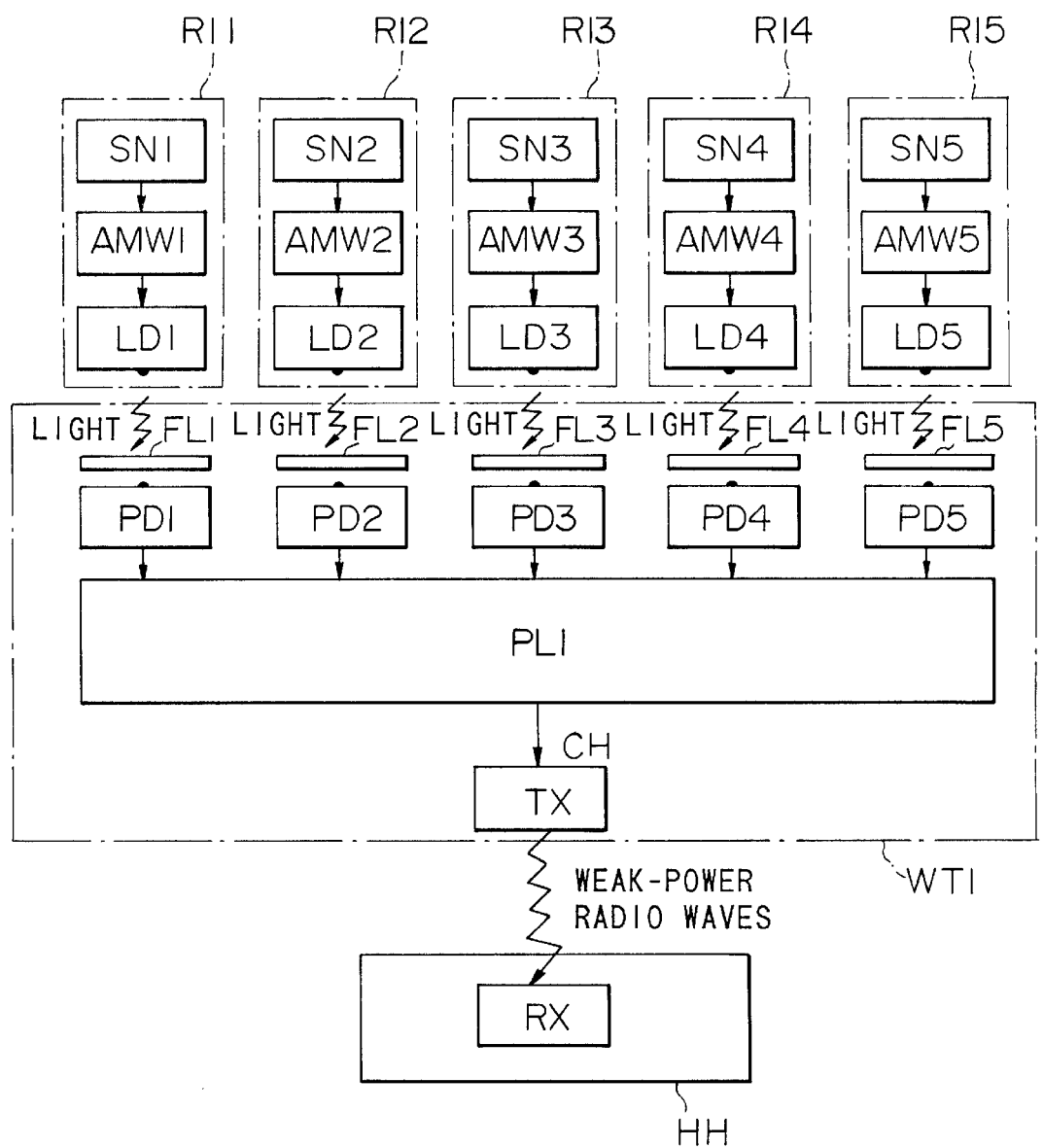
FIG. 2 is a block diagram showing a structural outline of a full-time wearable input device according to a First Embodiment of the present invention.

FIG. 1 shows a full-time wearable input device according to a First Embodiment of the present invention in the case when the full-time wearable input device is worn on the left hand. FIG. 2 is a block diagram showing a structural outline of the full-time wearable input device according to the First Embodiment. In FIGS. 1 and 2, a left hand HA, each finger FI1~FI5 of a left hand, finger-ring-type sensor modules R11~R15, wristwatch-style band WT1, sensors SN1~SN5, signal amplifiers AMW1~AMW5, light signal generators LD1~LD5, light filters FL1~FL5, light receptors PD1~PD5, analyzer PL1, output code CH, weak-power radio wave transmitter TX, wireless receiver RX, and a portable information processing apparatus HH, are provided.

Sensors SN1~SN5, signal amplifiers AMW1~AMW5, and light signal generators LD1~LD5, are packaged into the inner portions of finger-ring-type sensor modules R11~R15. Light filters FL1~FL5, light receptors PD1~PD5, analyzer PL1, and weak-power radio transmitter TX, are combined into wristwatch-style band WT1 and worn around the wrist and the like. Furthermore, a power module such as a battery is built into finger-ring-type sensor modules R11~R15 and wristwatch-style band WT1, respectively, as the electrical power source (not shown in the Figures). In the First Embodiment, shock sensors are used as sensors SN1~SN5: these shock sensors SN1~SN5 are worn on each finger and detect the shocks generated at the time when a fingertip strikes any typing surface (physical surface) such as a desk, floor, wall, thigh, or the like (hereinafter referred to as "finger-typing"). Signal amplifiers AMW1~AMW5 perform initial amplification and pulse width modulation on each shock signal detected by means of shock sensors SN1~SN5. Light signal generators LD1~LD5 generate a signal by modifying an amplified signal outputted from signal amplifiers AM1~AM5 into a light pulse. Light receptor PD1~PD5, which are built into wristwatch-style band WT1 receive the light pulse generated by light signal generators LD1~LD5. The light received is then channeled into an analyzer PALL, and an output code (character code) CH is then determined based on a method for determining a finger-typing pattern (to be explained hereinafter) using this analyzer PL. The output code CH determined in analyzer PL1 is then sent to a portable information processing apparatus HH possessing a wireless receiver RX via a weak-power radio wave transmitter TX. According to the First Embodiment, by modulating the pulse duration using the strength of the shock detected by means of shock sensors SN1~SN5, sensitivity modulation becomes possible by means of analyzer PL1.

Figure 10A:
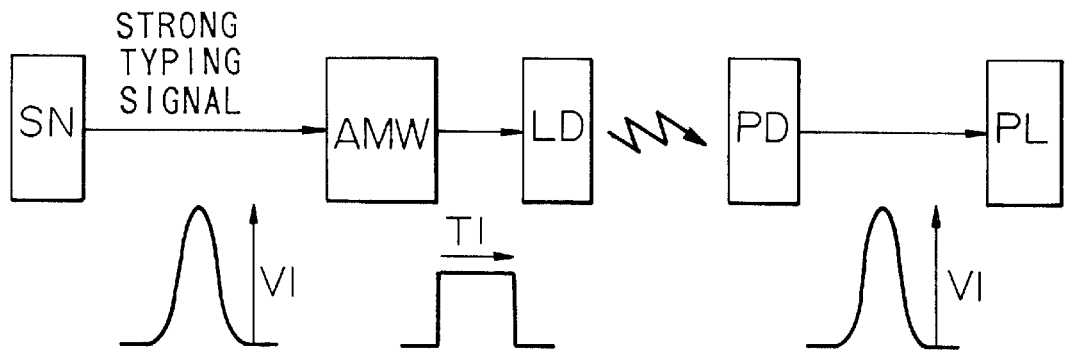
FIGS. 10A, 10B, and 10C are diagrams for use in explaining sensitive modulation using pulse width modulation according to a First Embodiment of the present invention.
Figure 10B:
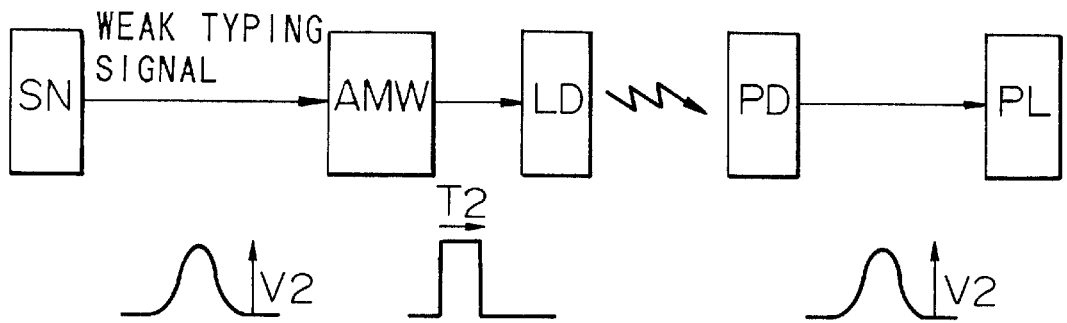
Figure 10C:
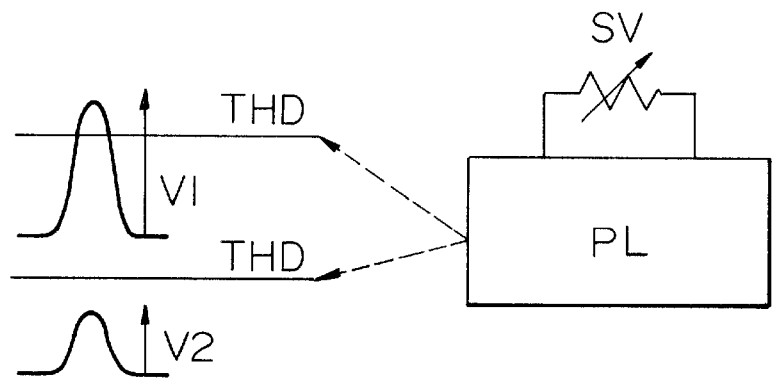

FIG. 10A and FIG. 10B are diagrams for use in explaining this sensitivity modulation using pulse width modulation according to the First Embodiment. As shown in FIGS. 10A and 10B, by performing pulse width modulation by means of respective signal amplifiers AMW and demodulation by means of light receptors PD, the strength of the input ("strong" in the case of FIG. 10A, and "weak" in the case of FIG. 10B) to shock sensors SN1~SN5 is transmitted to analyzer PL1. Subsequently, by means of a sensitivity variable structure SV provided in analyzer PL1, as shown in FIG. 10C, the threshold value THD of the input signal is manipulated, and the sensitivity at the time of finger-typing is then modulated. However, this aforementioned sensitivity modulation function is not absolutely necessary, as even in the case when this function is not present, in other words, when only shocks of a fixed level are detected, the basic actions of the full-time wearable input device according to the present invention remain the same.

Figure 9A:
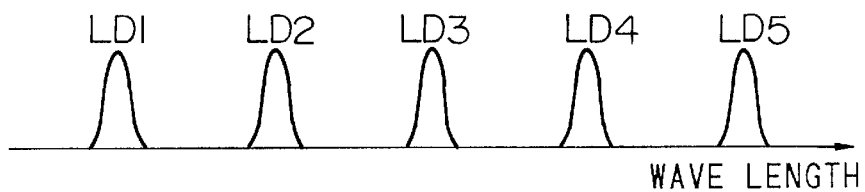
FIGS. 9A, 9B, 9C, and 9D show the arrangement of the light transceiver and filter, as well as the emission characteristics, transmittance properties, and characteristics of the light received according to a First Embodiment of the present invention.
Figure 9B:
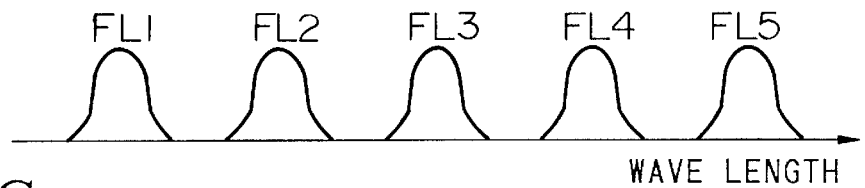
Figure 9C:
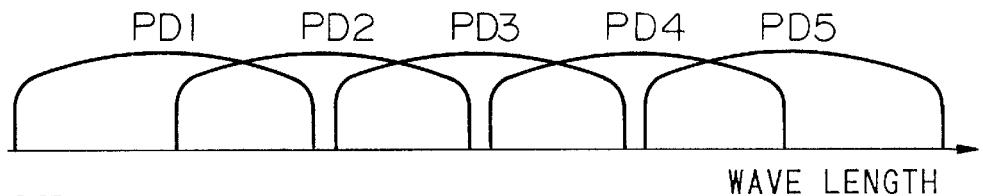
Figure 9D:
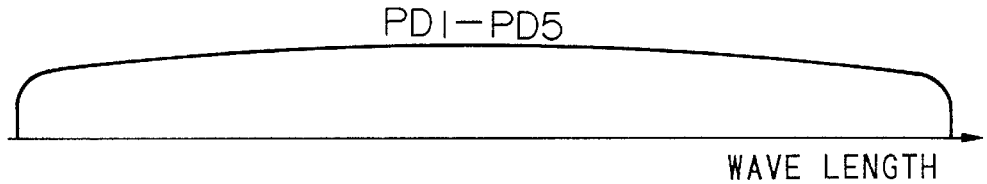

As shown in FIGS. 9A and 9B, according to the First Embodiment, the transmission wavelength of light signal generators LD1~LD5 are spaced apart at each finger FI1~FI5. In addition, different wavelength transmittance properties are imparted to light filters FL1~FL5 mounted in front of light receptor PD1~PD5, respectively, which in turn suppresses "Cross Talk". FIGS. 9A–9D show the arrangement of the light transceiver and filter, as well as the emission characteristics, transmittance properties, and characteristics of the light received therein. FIG. 9A shows the emission characteristics of light signal generators LD1~LD5 mounted in the interior portions of finger-ring-type sensor modules R11~R15, respectively, which are worn around each finger FI1~FI5. FIG. 9B shows the transmittance properties of light filters FL1~FL5. In addition, FIG. 9C shows respective characteristics of the light received by light receptors PD1~PD5 which are built into wristwatch-style band WT1. In FIG. 9C, the characteristics of the light received by light receptors PD1~PD5 are different. Here, as shown in FIG. 9D, it is also possible for the characteristics of the light received by light receptors PD1~PD5 to be identical.

In the following, the method for determining the finger-typing pattern in analyzer PL1 will be explained with reference to FIGS. 11A~11C which are diagrams for use in explaining a method for determining basic finger typing pattern. According to the First Embodiment, the finger-typing pattern is determined by combining single-typing, simultaneous-typing, and orderly typing. Since the pattern of the finger-typing resembles the playing of chords using a piano or the like, this situation will be referred to as "chord pattern".

Figure 11A:
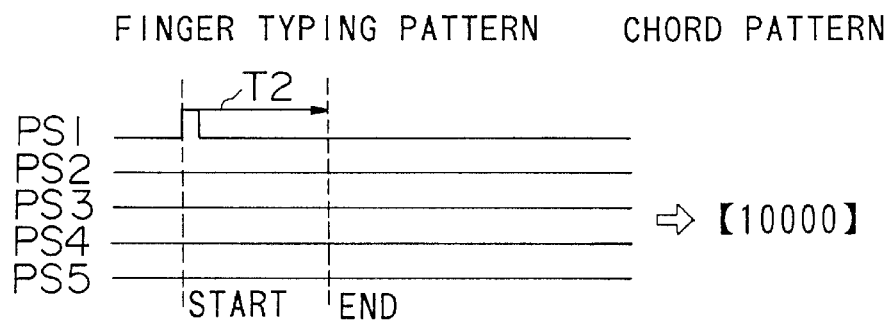
FIGS. 11A, 11B, 11C, 11D, and 11E are diagrams for use in explaining a method for determining finger-typing pattern according to a First Embodiment of the present invention.
Figure 11B:
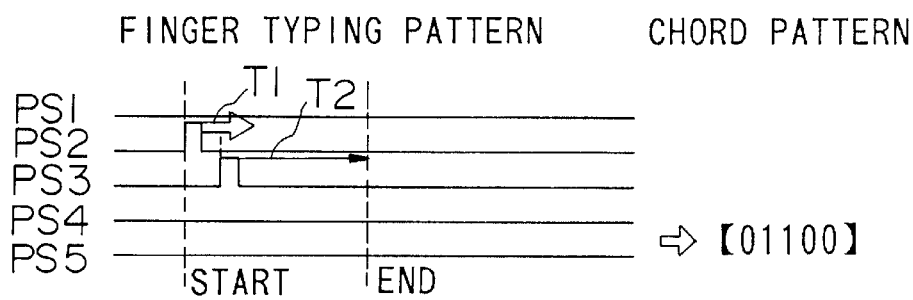
Figure 11C:
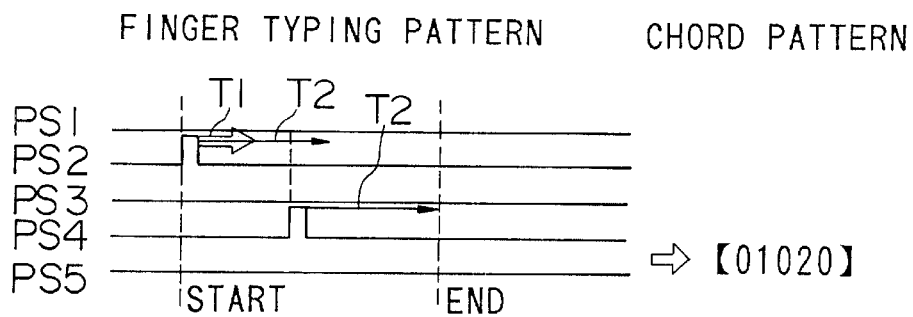

In FIGS. 11A~11C, PS1~PS5 indicate the finger-typing state over time of each finger (PS1~PS5 correspond to fingers FI1~FI5, respectively). The transition point from low level to high level represents the moment of finger-typing. FIG. 11 A shows a single-typing pattern; FIG. 11B shows a simultaneous-typing pattern; and FIG. 11C shows a orderly-typing pattern. In FIGS. 11A~11C, single-typing, simultaneous-typing, and orderly typing are identified using two types of identification times (T1, T2: predetermined constants) wherein the time points at the start of typing are used as origins. In the above case, T1 represents the identification time of simultaneous-typing, and T2 represents the identification time of orderly-typing. The numbers (1, 2, 3) within the chord patterns shown in FIGS. 11A~C indicate the sequential order in which the fingers are typed. For example, the chord pattern [01100] shown in FIG. 11B indicates that the index finger and middle finger were typed simultaneously. In the same manner, the chord pattern [01020] shown in FIG. 11C indicates that the index finger was typed first and then the ring finger was typed.

Figures 11D, 11E:
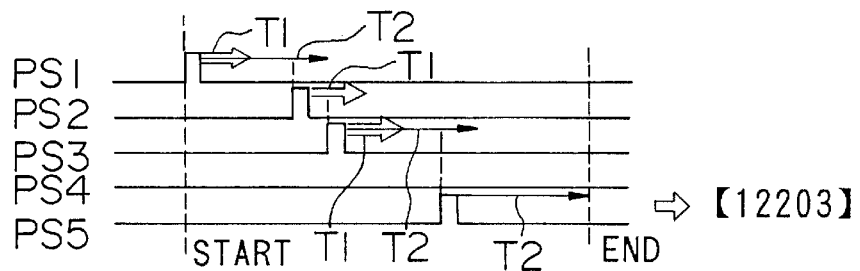

The character code (output code) CH is determined using the chord conversion table shown in FIG. 11D which is recorded in analyzer PL1 from the chord patterns obtained above.

In the following, the actions of the full-time wearable input device according the present embodiment will be explained in the case when this device is worn and operated. The initial state has the user wearing finger-ring-type sensor modules R11~R15, and wristwatch-style band WT1 on the left hand, such that portable information processing apparatus HH exists in a potential signal reception state. When the user communicates a character input of "D" from the alphabet, the finger-typing actions are as shown in FIG. 11E. In other words, after initially conducting light key-typing actions using thumb FI1, subsequent key-typing action is conducted by striking the index finger FI2 and the middle finger FI3 at approximately the same time. In the same manner, key-typing action is then performed using the little finger FI5. At this time, the threshold value THD of the input signal is modified by means of the aforementioned sensitivity variable structure SV such that each of the aforementioned light key-typing actions is sufficient.

The shocks generated by the aforementioned actions are then sequentially detected by means of the aforementioned shock sensor SN, and signal processing is performed as shown in FIG. 10B via signal amplifier AMW. The light pulses which have undergone pulse width modulation are then sequentially outputted from light signal generator LD. Each light pulse is received by light receptor PD in wristwatch-style band WT1, demodulated to its original analog voltage, and then sent to analyzer PL1. In analyzer PL1, the aforementioned analog voltage is compared with a predetermined threshold value THD. Finger-typing is then confirmed only in the case when the aforementioned input is greater than the threshold value THD. Furthermore, modification of the threshold value THD can be performed in a similar manner as in software by directly transmitting the signal which has undergone pulse width modulation to the analyzer without conducting demodulation to the analog voltage in light receptor PD. In addition, in the above case, it is also possible to influence the finger-typing strength at the time of code conversion (e.g., formation of different codes depending on the finger-typing strength).

Furthermore, with regard to determination of the character code, in the case when the finger-typing strength is not used and/or in the case when the threshold is not varied, a comparison is conducted with a threshold THD (previously set) in the initial amplifier AMW from among finger-ring-type sensor modules R11~R15. It is hence possible to conduct miniaturization of the device structure, as well as reduction of the consumption electricity by means of transmitting a pulse of a fixed width to light transmitter LD only in the case when the aforementioned threshold is exceeded.

In analyzer PL1, the chord pattern [12203] of the aforementioned finger-typing action (FIG. 11E) is then converted to code "D" based on the code conversion table shown in FIG. 11D, and outputted as output code CH.

The determined code CH is then transmitted and received via weak-power radio transmitter TX within wristwatch-style band WT1 and wireless receiver RX within portable information processing apparatus HH and then detected in portable information processing apparatus HH which is provided inside a pocket, bag or the like. Following this, the user can then perform input of character information whenever desired by means of attaching the full-time wearable input device of the present embodiment to the body and conducting light finger-typing actions during normal daily life.

Figure 3A:
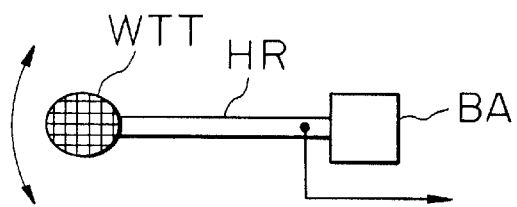
FIG. 3A and FIG. 3B show an example of the potential use of an acceleration sensor in a full-time wearable input device according to a First Embodiment of the present invention.

In the present embodiment, it is also possible to employ an acceleration sensor in place of shock sensors SN1~SN5; in this case, in order to detect shocks of a specific frequency generated by means of finger-typing, it is preferred that the acceleration sensors possess a high sensitivity to acceleration of a predetermined frequency (hereinafter referred to as "desired acceleration"). Furthermore, it is preferred that the acceleration sensor be compact and possess the ability to suppress signals other than the acceleration component of the specific frequency generated by means of finger-typing such as noise and the like. Use of the acceleration sensor shown in the following Figs. is particularly effective. FIG. 3A shows an example of an acceleration sensor for potential use in the full-time wearable input device according to the First Embodiment. In FIG. 3A, an acceleration detector HR, weight WTT, and base BA are provided; when a vibration is imparted to the acceleration sensor, detecting element HR vibrates using base BA as a fulcrum, which in turn generates an electric signal in response to this vibration. In FIG. 3A, a piezoelectric component is used in acceleration detecting element HR; however, it is also possible to use an inexpensive component such as a variable resistor or the like. The electrical signal generated from the acceleration detecting element differs in accordance with the type of acceleration detecting element used; however, this can be recognized by means of changes in the voltage, resistance, and capacitance.

Figure 3B:
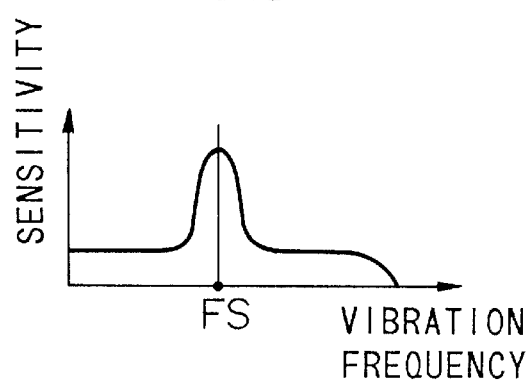

FIG. 3B shows the sensitivity with respect to the vibration frequency of the acceleration sensor shown in FIG. 3A. By appropriate selection of the weight WTT, shape of the acceleration detecting element HR, and overall structure, the resonance frequency of the acceleration sensor can be conformed to the frequency FS of the desired acceleration to obtain a high sensitivity with respect to the aforementioned acceleration. Furthermore, "conformity" of frequencies is not limited to conformity of physical values as it is also possible to extend this definition to include all ranges in which resonance may occur. In this case, a relative reduction in the sensitivity to frequencies other than resonance frequencies is observed, and thus it is possible to omit electrical filtering in the case when extracting an acceleration with a desired frequency component from among noise.

Figure 4:
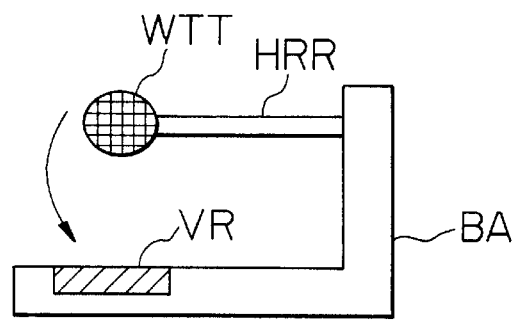
FIG. 4 shows another example of the potential use of an acceleration sensor in a full-time wearable input device according to the First Embodiment of the present invention.

FIG. 4 shows another example of an acceleration sensor for potential use in the full-time wearable input device according to the First Embodiment. In FIG. 4, a cantilever HRR which serves as a spring, weight WTT, sensor base BA, and microphone VR are provided. When vibrations are imparted to this acceleration sensor, cantilever HRR vibrates with base BA as its fulcrum and comes in contact with microphone VR. In FIG. 4, a microphone is used as the acceleration detecting element; however, it is also possible to employ a piezoelectric component, variable resistor, or the like. In this manner, by appropriately selecting weight WTT, cantilever HRR, as well as the structure, the resonance frequency of the sensor can be conformed to the desired acceleration frequency to obtain a high sensitivity.

Figure 5A:
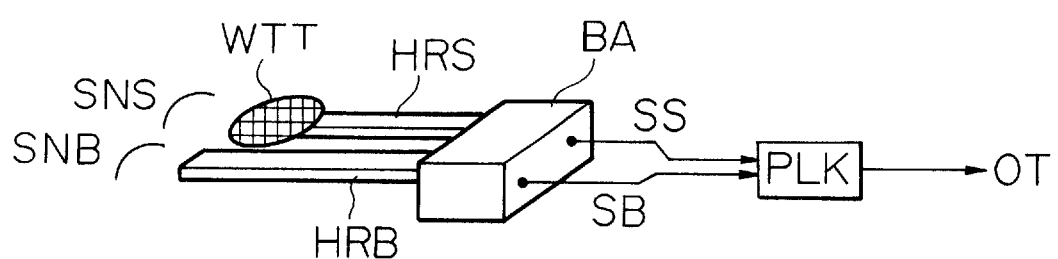
FIG. 5A and FIG. 5B show another example of the potential use of an acceleration sensor in a full-time wearable input device according to the First Embodiment of the present invention.

FIG. 5A shows another example of an acceleration sensor for potential use in the full-time wearable input device according to the First Embodiment. The acceleration sensor shown in FIG. 5A comprises one set of acceleration detecting elements. In FIG. 5A, acceleration detecting elements HRS and HRB, weight WTT, sensor base BA, and processing apparatus PLK are provided. In this manner, weight WTT is installed on detecting element HRS to form an acceleration sensor SNS possessing a high sensitivity with respect to the desired frequency FS to be detected. In contrast, a weight is not installed on detecting element HRB such that an acceleration sensor SNB is formed which possesses a uniform sensitivity to all frequencies. When vibrations are imparted to this acceleration sensor, detecting elements HRS and HRB vibrate with base BA as the fulcrum, and electrical signals SS and SB are generated in response to these vibrations. These signals are then transmitted to processing apparatus PLK to form acceleration output OT.

Figure 5B:
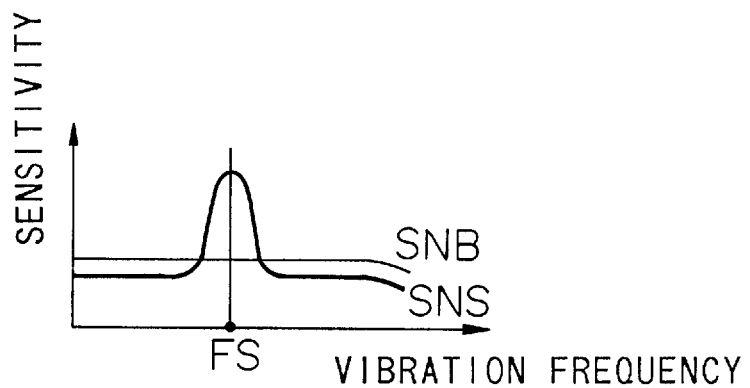

FIG. 5B shows the sensitivity with respect to the vibration frequency of the acceleration sensor shown in FIG. 5A. As described above, acceleration sensor SNS possesses a high sensitivity with respect to a desired frequency FS to be detected, while acceleration sensor SNB possesses a uniform sensitivity with respect to all frequencies. Sensor SNS possesses a high sensitivity in the vicinity of the desired frequency FS to be detected, and hence, in the case when a large component of this same desired frequency FS is incorporated into the background noise, amplification results. By jointly employing the acceleration sensor shown in FIG. 5A with sensor SNB, it is possible to monitor the distribution state of the background noise. Consequently, in the case when significant noise exists, it is possible to avoid misdetecting this noise by means of processing such as lowering the amplification ratio of sensor SNS.

Figure 6:
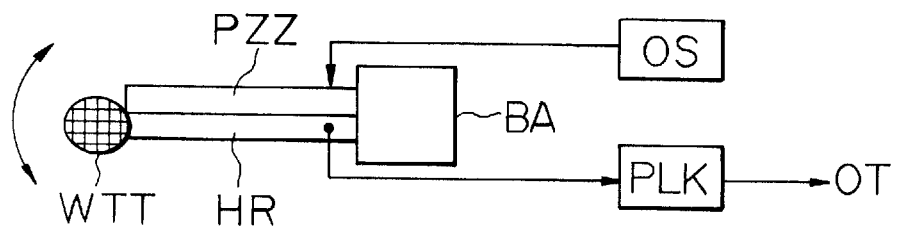
FIG. 6 shows another example of the potential use of an acceleration sensor in a full-time wearable input device according to the First Embodiment of the present invention.

FIG. 6 shows another example of an acceleration sensor for potential use in the full-time wearable input device according to the First Embodiment. The acceleration sensor shown in FIG. 6 is one in which an acceleration detecting element and vibrator are jointly used. As shown in FIG. 6, an acceleration detecting element HR, a vibrator PZZ, weight WTT, sensor base BA, processing apparatus PLK, and oscillating wave generator OS are provided. As seen from FIG. 6, weight WTT is attached to acceleration detecting element HR such that a high sensitivity to the desired frequency FS to be detected is obtained. In addition, vibrator PZZ is also attached to the acceleration detecting element HR, hence this acceleration detecting element HR can be vibrated in accordance with a signal from the oscillatory wave generator OS. The frequency amplitude and phase of the oscillating wave generated by the oscillating wave generator OS are regulated by means of the above-mentioned analyzer PL1. By means of the acceleration sensor shown in FIG. 6, vibrator PZZ is lightly vibrated at a predetermined resonance frequency FS. In the case when exterior vibrations are imparted to this acceleration sensor while in a stationary state, a small amount of time is required for resonance to occur due to the inertia of the detecting element and weight. In the case when the exterior vibration is a multiple waveform or a single waveform such as a pulse, satisfactory resonance cannot be obtained. In contrast, in the case when a weak resonance is generated by imparting a predetermined weak vibration (pre-vibration) as explained above, it is possible to generate a sufficient resonance and also obtain a high output even with respect to exterior vibrations possessing pulse characteristics. Furthermore, although resonance is suppressed in the case when the phase of the exterior vibration is opposite that of the pre-vibration, this situation can be dealt with by means of detecting a rapidly suppressed state. In addition, by employing a plurality of sensors, a high sensitivity can be obtained with respect to exterior vibrations of various phases by means of imparting pre-vibrations of slightly different phases.

Figure 7:
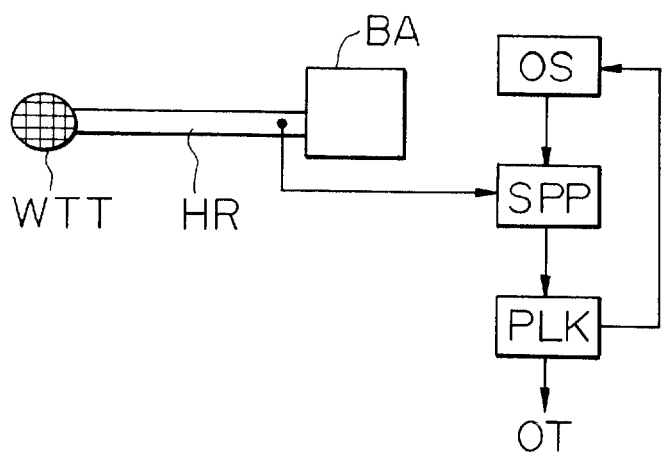
FIG. 7 shows another example of the potential use of an acceleration sensor in a full-time wearable input device according to the First Embodiment of the present invention.

FIG. 7 shows another example of an acceleration sensor for potential use in the full-time wearable input device according to the First Embodiment. In the acceleration sensor shown in FIG. 7, the acceleration detecting element corresponding to one in the acceleration sensor shown in FIG. 6 also serves as a vibrator. As shown in FIG. 7, an acceleration detecting element HR, weight WTT, sensor base BA, processing apparatus PLK, oscillating wave generator OS, and separator SPP are provided. With regard to the acceleration sensor shown in FIG. 7, a piezoelectric component, microphone, or the like is used in the acceleration detecting element HR, and a signal from the oscillating wave generator OS is applied to the aforementioned acceleration detecting element HR via separator SP. In this manner, acceleration detecting element HR is vibrated. In other words, the acceleration detecting element HR of the acceleration sensor shown in FIG. 7 also serves as a vibrator. Furthermore, in the acceleration sensors shown in FIGS. 6 and 7, it is possible to increase the sensitivity with respect to various exterior vibrations without changing the resonance frequency FS by means of applying a pre-vibration of a frequency EP which differs from the resonance frequency FS of acceleration detecting element HR, and then conforming the frequency of the beat vibration with an exterior vibration FG to the resonance frequency FS.

Figure 8:
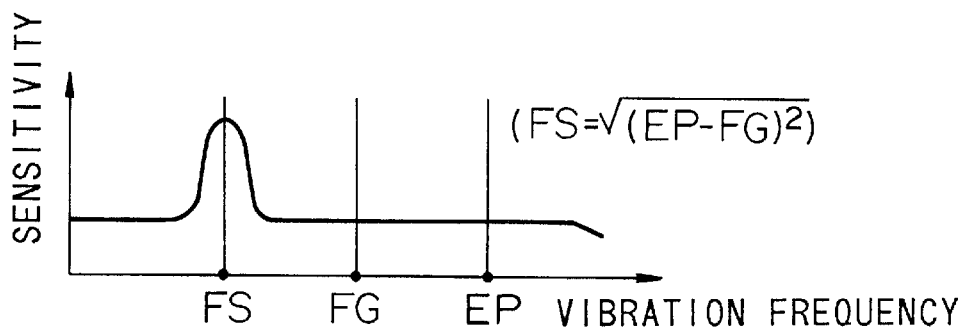
FIG. 8 is a graph showing the relationship between the pre-oscillation frequency EP, exterior vibration FG, and resonance frequency FS in the case when a beat is utilized in the acceleration sensors of FIG. 6 and FIG. 7.

FIG. 8 shows the relationship between pre-vibration frequency EP, exterior vibration FG, and resonance frequency FS in the case when a beat vibration is utilized in the acceleration sensors shown in FIGS. 6 and 7.

Furthermore, the following modifications to the full-time wearable input device according to the First Embodiment are possible.

1. Use of weak-power radio or sound waves in place of light as the medium for transmitting a signal between finger-ring-type sensor modules R11~R15 and wristwatch-style band WT1.
2. Compact (miniaturize) portable information apparatus HH and incorporate it into wristwatch-style band WT1 along with analyzer PL1.
3. Use of an acceleration sensor or sensor for detecting myoelectric and/or myomagnetic fields such that detection of not only the moment (instant) of finger-typing, but also the time point at which the fingers leave the physical surface, as well as actions of the hands and arms before or after finger-typing is possible. In this manner, the detection precision is increased, and/or more complex input actions become possible.

[Second Embodiment]

In the following, a Second Embodiment of the present invention will be explained with reference to the Figs. It is preferred that the sensor to be used in the full-time wearable input device be extremely compact and also not require an electrical power source or signal lines for transmitting the measured results. In the following, a full-time wearable input system in which this type of sensor is employed will be explained.

Figure 12A:
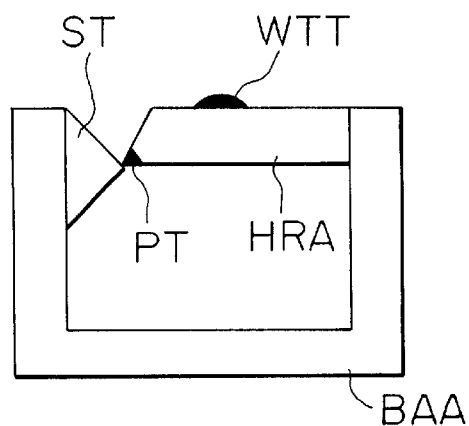
FIGS. 12A and 12B show an example of a shock sounding body in which an electrical power supply to the sensor and a signal conductor for transmitting a measured result are unnecessary.
Figure 12B:
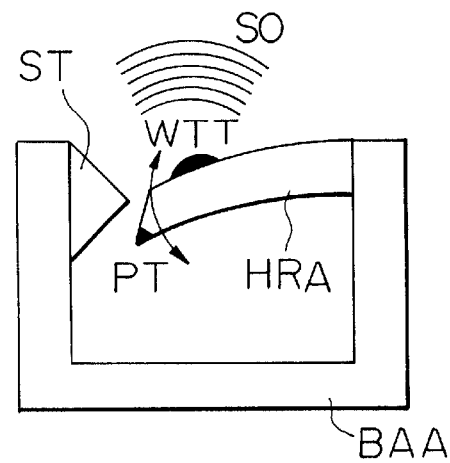

A super-compact sensor which does not require an electrical power source to the sensor and signal lines for transmitting measured results will now be explained. FIGS. 12A and 12B show an example of the shock-sounding body which requires neither an electrical power source to the sensor nor signal lines for transmitting the measured results. In FIG. 12A, a base BAA of a sounding body, a sounding body HRA possessing a cantilever shape, weight WTT, stopper ST, and contact point PT are shown. As seen from FIG. 12A, under normal circumstances, sounding body HRA rests on the upper part of stopper ST in the case when shock is not being provided. At this time, contact point PT is either in contact with stopper ST or slightly separated from it. FIG.

12B shows a situation in which shock is imparted to the aforementioned shock sounding body. As shown in the Fig., sounding body HRA is separated from stopper ST by means of this shock, thereby bending in the lower direction. At this time, sounding body HRA, base PAA, or the entire structure vibrates and produces a micro-sound SO due to the contact or strong wearing of contact point PT on stopper ST. After the application of shock is ceased, sounding body HRA returns to its original position due to its intrinsic elasticity.

Figure 13A:
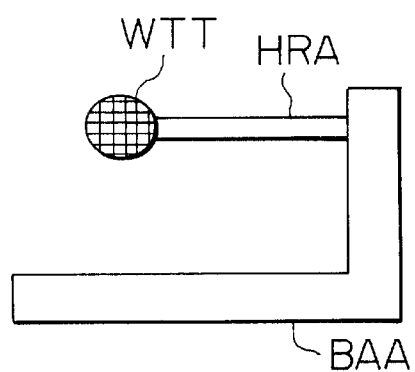
FIG. 13A and FIG. 13B show another example of the sounding body in which an electrical power supply to the sensor and a signal conductor for transmitting the measured result are unnecessary.
Figure 13B:
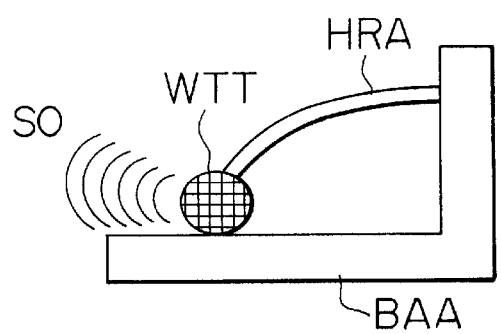

FIG. 13A and FIG. 13B show another example of a shock sounding body which requires neither an electrical power supply to the sensor nor signal lines for transmitting the measured result. In FIG. 13A, the base BAA of a sounding body, a sounding body HRA possessing a cantilever shape, and weight WTT are provided. As shown in FIG. 13A, under normal circumstances, when shock is not being applied, sounding body HRA rests in midair. FIG. 13B shows a situation in which shock is applied to this shock sounding body. In this situation, sounding body HRA bends due to the shock and comes into contact with base BAA such that sounding body HRA, base BAA, or the entire structure vibrates to produce a micro-sound SO. When the application of shock is ceased, sounding body HRA returns to its original position by means of its intrinsic elasticity.

Figure 14:
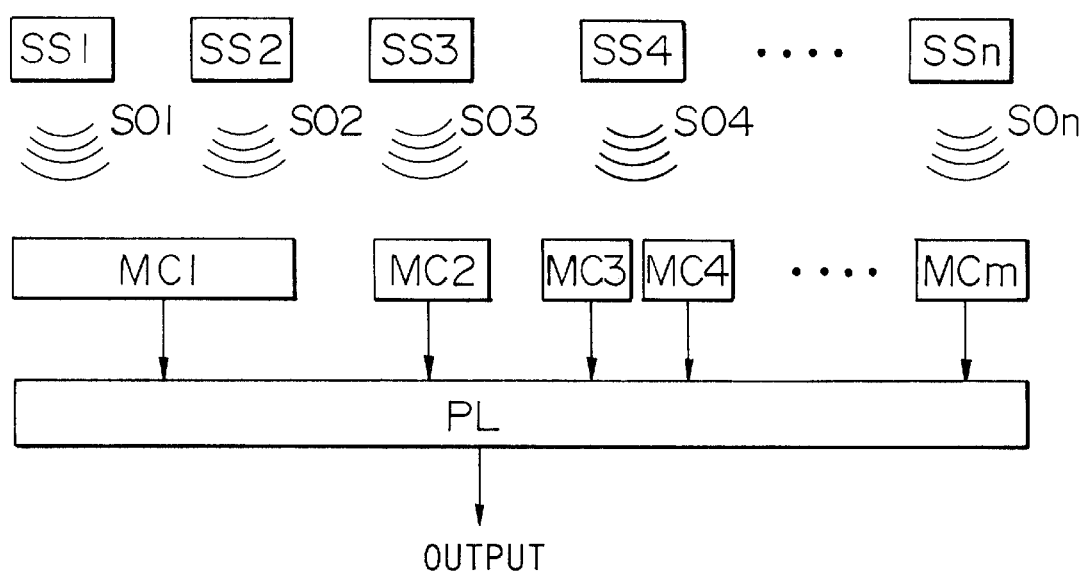
FIG. 14 is a block diagram showing a structural outline of a detection system for detecting micro-sounds of the shock sounding bodies shown in FIG. 12A and FIG. 13A.

FIG. 14 is a block diagram showing a structural outline of a detection system for detecting micro-sound SO of the shock sounding bodies shown in FIG. 12A and FIG. 13A. In FIG. 14, a shock sounding bodies SS1~SSn, shock sound collectors MC1~MCm, and analyzer PL are provided. Upon receiving a shock, each of the aforementioned shock sounding bodies SS1~SSn generates a micro-sound SO1~SO5, respectively; each of these micro-sounds SO is detected by a shock sound collector MC and then transmitted from the shock sound collector MC to analyzer PL. Analyzer PL analyzes the strength of the micro-sounds, as well as the frequency distribution, and then outputs the signals representing the shock sounding body which has received the shock and the degree of the shock. Due to the conversion of the physical shock into "sound", the driving electrical power of the sensor portion becomes unnecessary. Similarly, by means of transmitting the measured result using micro-sound, electrical lines and transceivers for transmitting the detected result to the analyzer become unnecessary. Furthermore, the pitch (height of the tone) and tone color (spectral distribution) of the micro-sound generated by the shock sounding body can be managed by means of changing the composition, size, and/or shape of each of the structural components, i.e., sounding body HRA, weight WTT, stopper ST, contact point PT and base BAA. Consequently, it is possible to jointly use a plurality of sounding bodies possessing different pitch and tone colors; it is also possible to simultaneously measure a plurality of channels. In addition, since the generated micro-sound is outside of the audible range of humans, it is possible to transmit the measured results without rendering any discomfort to humans.

Moreover, it is also possible to raise (or lower) the sensitivity with respect to a random shock (strength and/or frequency component) by means of manipulating the resonance point through varying the composition, size, and/or shape of each of the aforementioned structural components, i.e., sounding body HRA of shock sounding body, weight WTT, stopper ST, contact point PT, and base BAA. In this manner, it is possible to amplify only the desired shock and hence remove unnecessary shock. Finally, it is possible to use the aforementioned shock sound collector MC singly, however, the detection sensitivity can be further improved by employing a plurality of these aforementioned shock sound collectors MC.

Figure 15:
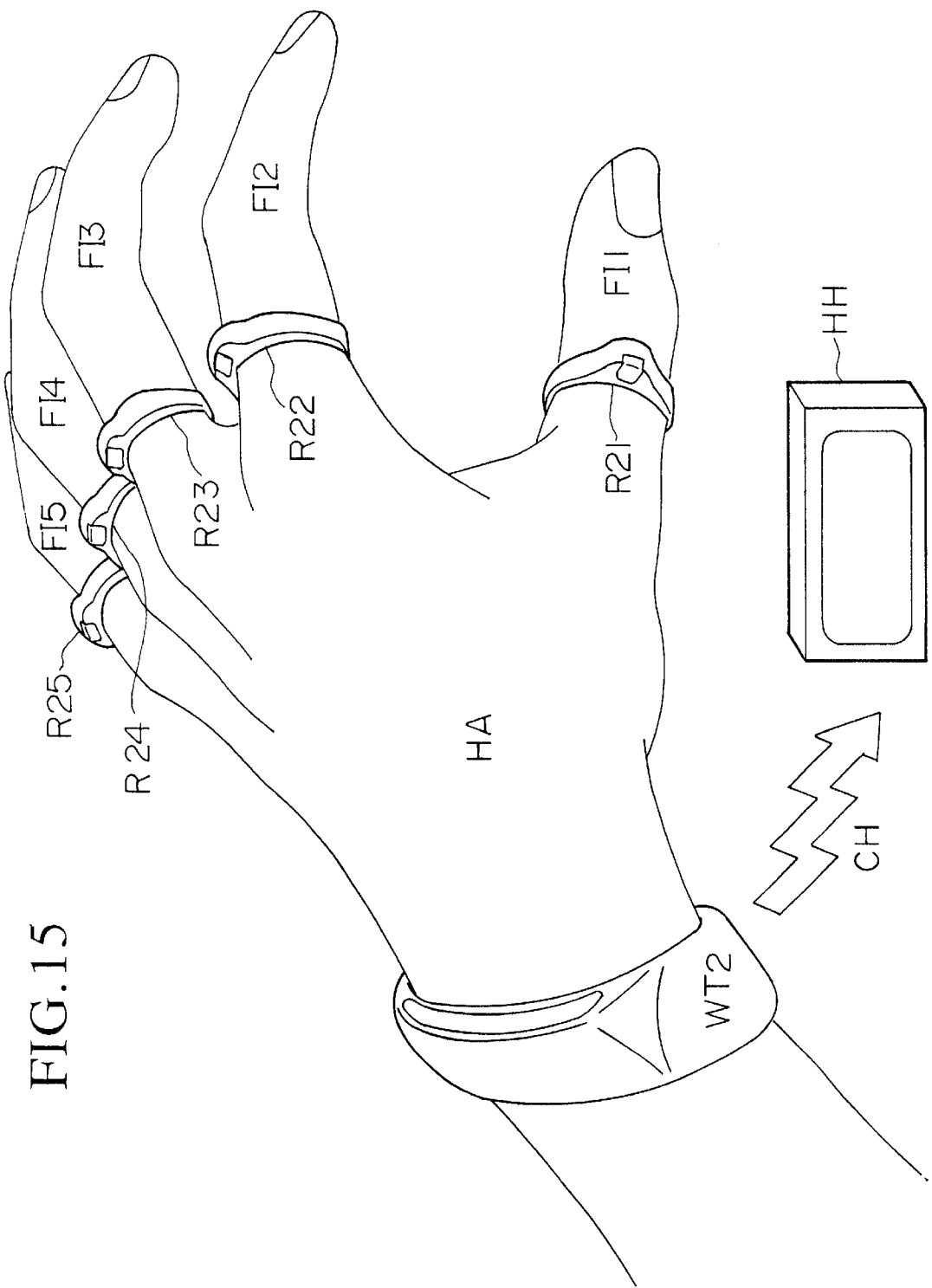
FIG. 15 shows a full-time wearable input device according to a Second Embodiment of the present invention in the case where the full-time wearable input device is worn on a left hand.
Figure 16:
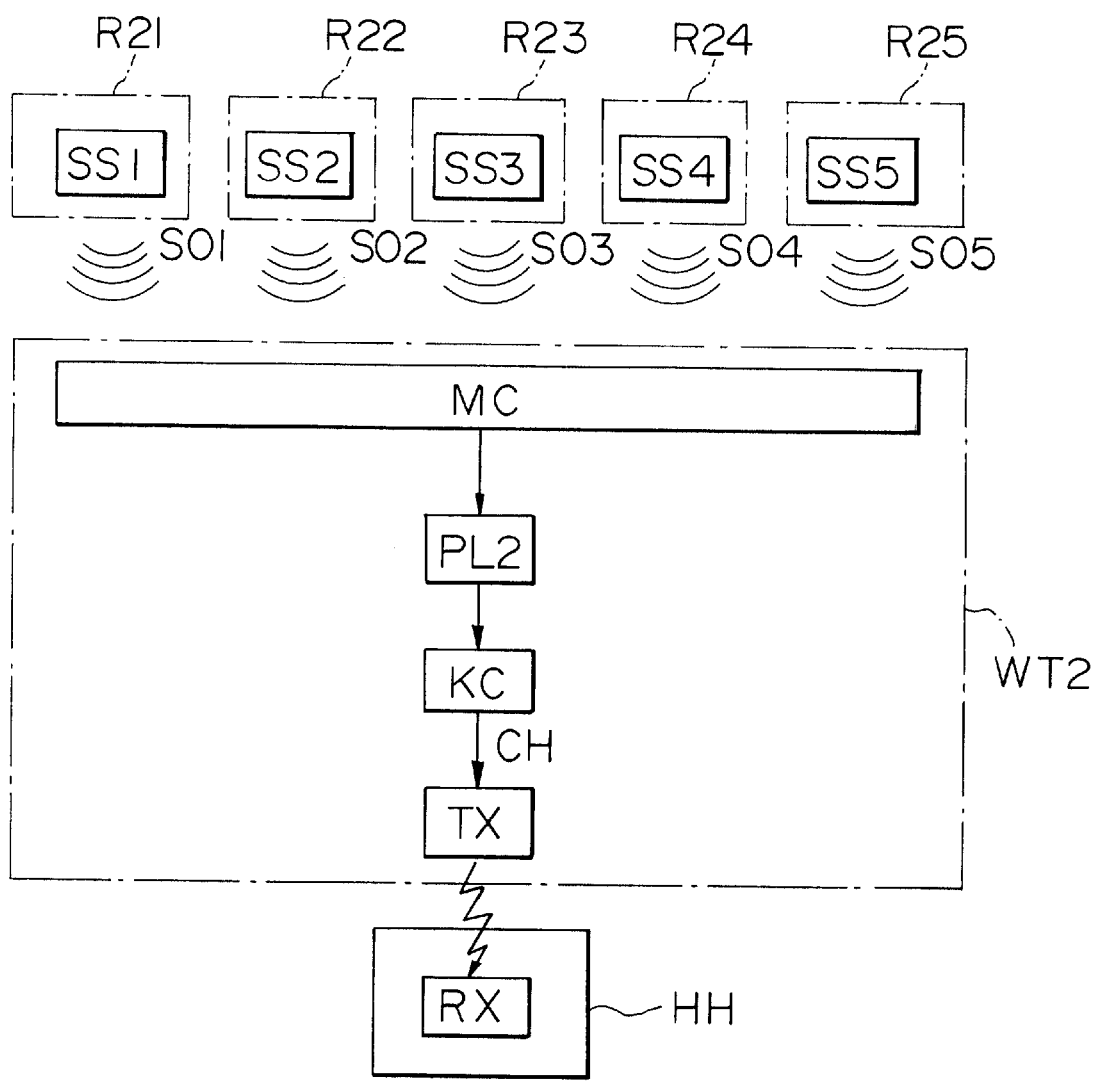
FIG. 16 is a block diagram showing a structural outline of a full-time wearable input device according to a Second Embodiment of the present invention.

FIG. 15 shows a full-time wearable input device according to a Second Embodiment of the present invention. This Fig. shows the case in which the full-time wearable input device according to the Second Embodiment is worn on the left hand. FIG. 16 is a block diagram showing a structural outline of the full-time wearable input device according to the Second Embodiment. This full-time wearable input device employs the shock sounding body shown in FIGS. 12 and 13 as a shock sensor.

In FIGS. 15 and 16, a left hand HA, fingers of this left hand FI1~FI5, finger-ring sensor modules R21~R25, shock sounding bodies SS1~SS5, shock sound collector MC, analyzer PL2, key code analyzer KC, wristwatch-style band WT2, output code CH, weak-power radio wave transmitter TX, wireless receiver RX, and portable information processing apparatus HH are provided.

The aforementioned shock sounding bodies SS1~SS5 are packaged, respectively, into the inner portions of finger-ring-type sensor modules R21~R25. In addition, shock sound collector MC, key code analyzer KC, and analyzer PL2 are built into wristwatch-style band WT2 and worn around the wrist. Furthermore, a power module such as a battery or the like is also built into the wristwatch-style band WT2 as an electrical power source (not shown in the FIGS.).

Shock sounding bodies SS1~SS5 which are worn around each finger produce micro-sounds SO1~SO5 by means of the shocks generated at the time of performing typing actions with the fingers on a physical surface such as a floor, a wall, a thigh, or the like. Output code CH is then determined by sending each of the aforementioned micro-sounds SO to key code analyzer KC as key-typing information from each finger via shock sound collector MC and analyzer PL2. In the aforementioned case, the method for determining the finger-typing pattern is the same as the method employed in the above First Embodiment.

The determined output code CH is then sent to portable information processing apparatus HH possessing a wireless receiver RX in its interior portion via weak-power radio wave transmitter TX. Furthermore, it is also possible to compact portable information processing apparatus HH and package this device into wristwatch-style band WT2.

According to the Second Embodiment, in the construction of the full-time wearable input device, it is possible to solve problems relating to the driving electrical power source of the sensor, output signal lines of the sensor, and miniaturization of the sensor.

[Third Embodiment]

Figure 17:
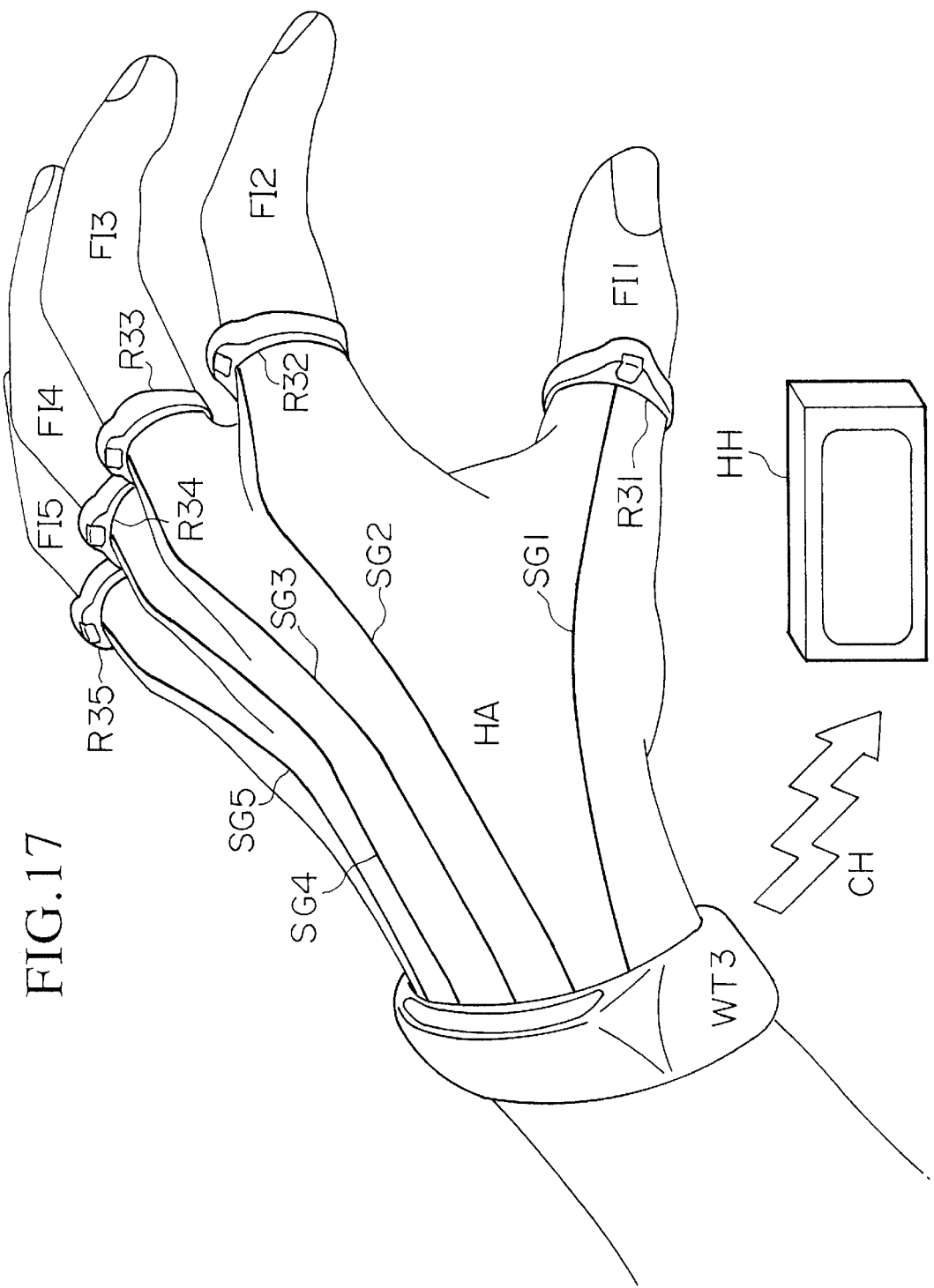
FIG. 17 shows a full-time wearable input device according to a Third Embodiment of the present invention in the case when the aforementioned full-time wearable input device is worn on the left hand.
Figure 18:
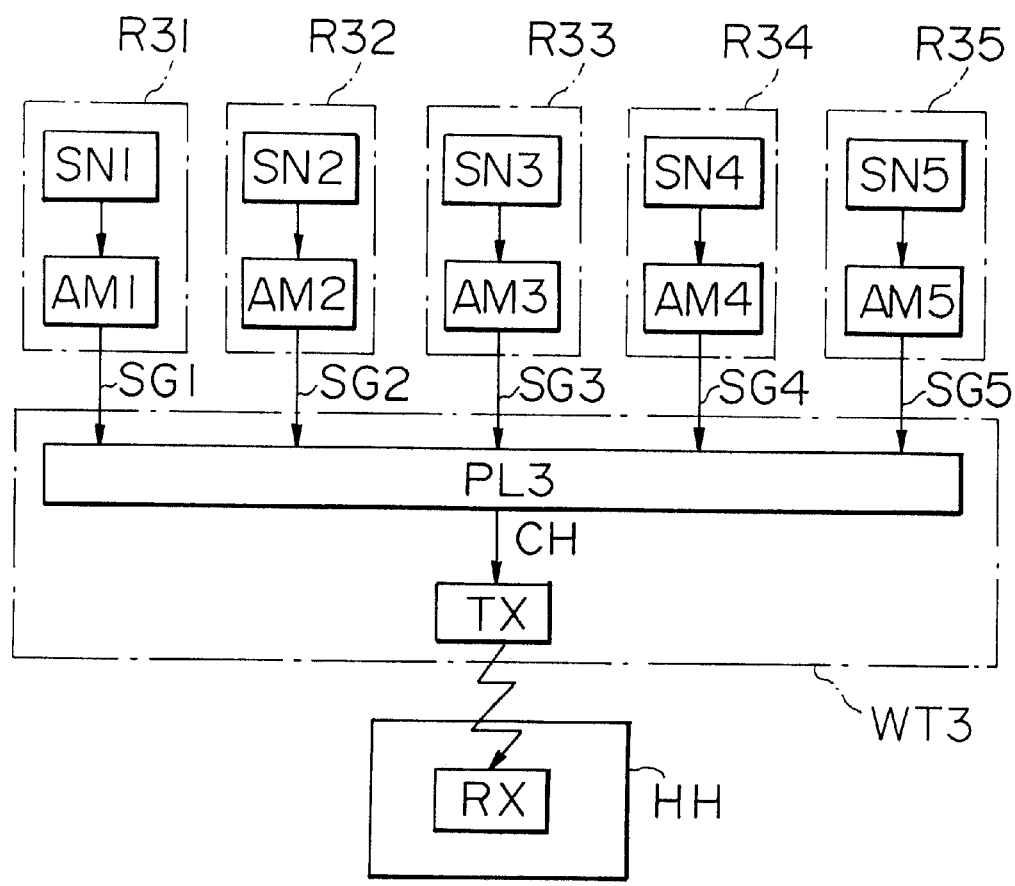
FIG. 18 is a block diagram showing a structural outline of a full-time wearable input device according to a Third Embodiment of the present invention.

FIG. 17 shows a full-time wearable input device according to a Third embodiment of the present invention. This Fig. shows the case in which the full-time wearable input device according to the Third Embodiment is worn on the left hand. FIG. 18 is a block diagram showing a structural outline of the full-time wearable input device according to the Third Embodiment.

In FIGS. 17 and 18, a left hand HA, each finger of the left hand FI1~FI5, finger-ring-type sensor modules R31~R35, sensors SN1~SN5, signal amplifiers AM1~AM5, analyzer PL3, wristwatch-style band WT3, output code CH, weak-power radio wave transmitter TX, wireless receiver RX, and portable information processing apparatus HH are provided. Sensors SN1~SN5 and signal amplifiers AM1~AM5 are packaged into the interior of finger-ring-type sensor modules R31~R35. Similarly, analyzer PL3 is built into wristwatch-style band WT3 and the entire structure is worn around the wrist. Furthermore, a power module such as a battery or the like is built into finger-ring-type sensor modules R31~R35 and wristwatch-style band WT3 as an electrical power source (not shown in the Figures).

According to the Third Embodiment of the present invention, a microphone is employed in each of the shock sensors SN1~SN5 worn around the fingers by means of which these sensors SN1~SN5 detect sound and vibrations generated at the time of finger-typing on a physical surface such as a floor, a wall, an upper thigh, or the like.

The shock signal detected by means of sensors SN1~SN5 undergo initial amplification by means of signal amplifiers AM1~AM5, and are the directly inputted into analyzer PL3 via signal lines SG1~SG5 to determine an output code CH. In this case, the finger-typing pattern is determined by the same method as employed in the aforementioned First Embodiment. Furthermore, according to the Third Embodiment, the determined output code CH is sent to portable information processing apparatus HH possessing a wireless receiver RX in the interior portion therein via weak-power radio wave transmitter TX.

In addition, it is also possible to compact the portable information processing apparatus HH and package this apparatus along with analyzer PL3 into the interior of wristwatch-style band WT3. According to the Third Embodiment of the present invention, the finger-ring-style sensor modules R3~R35 and wristwatch-style band WT3 are connected by an extremely fine signal line SG so as to not form a hindrance during normal wear. However, in order to protect the signal line, it is preferable to use an outfitting such as glove or the like with the fingertips cut off. Furthermore, as the sensor, it is also possible to use a strain gauge, pressure-sensitive resistor, or the like, in place of the microphone.

[Fourth Embodiment]

Figure 19:
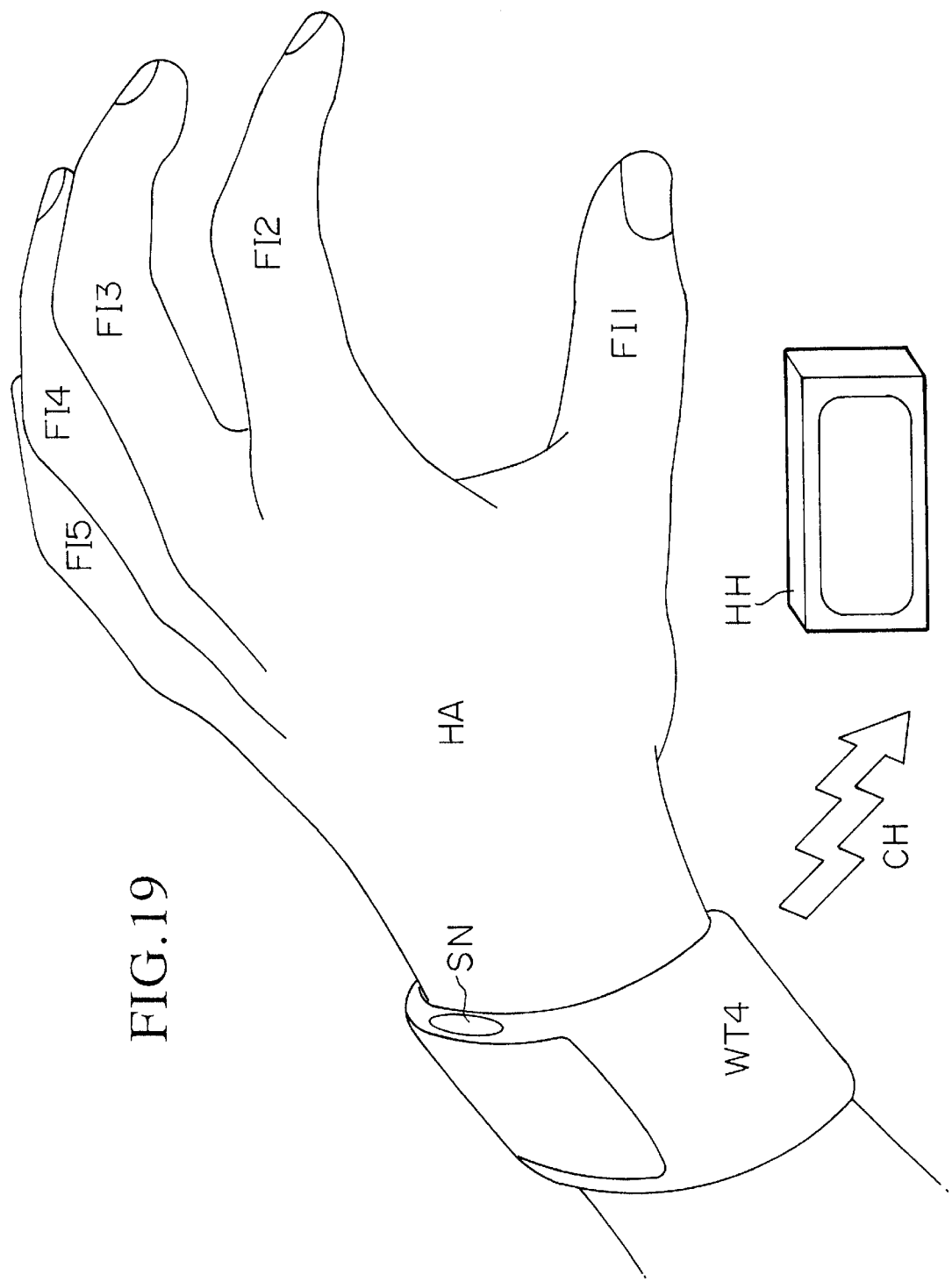
FIG. 19 shows a full-time wearable input device according to a Fourth Embodiment of the present invention in the case when the aforementioned full-time wearable input device is worn on the left hand.
Figure 20:
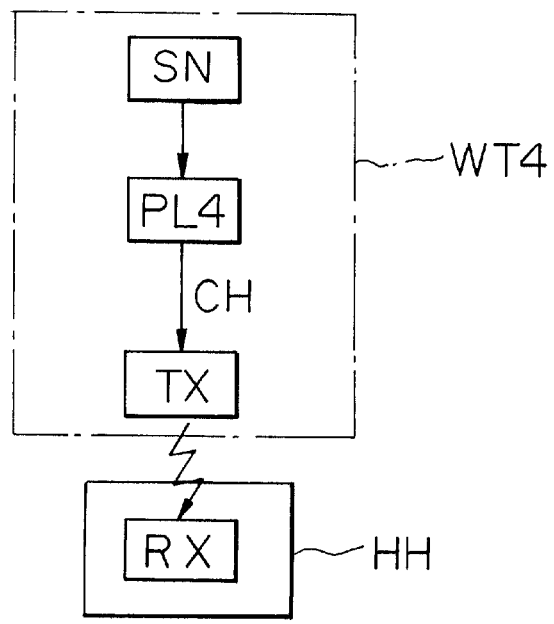
FIG. 20 is a block diagram showing a structural outline of a full-time wearable input device according to a Fourth Embodiment of the present invention.

FIG. 19 shows a full-time wearable input device according to a Fourth Embodiment of the present invention. This Fig. shows the case in which the aforementioned full-time wearable input device is worn on the left hand. FIG. 20 is a block diagram showing a structural outline of a full-time wearable input device according to the Fourth Embodiment. In FIGS. 19 and 20, a left hand HA, fingers of the left hand FI1~FI5, sensor SN, analyzer PL4, wristwatch-style band WT4, output code CH, weak-power radio wave transmitter TX, wireless receiver RX, and portable information processing apparatus HH are provided. Sensor SN is built into the wristwatch-style band WT4 along with analyzer PL4 and the entire structure is worn around the wrist. Consequently, according to the Fourth Embodiment of the present invention, the complication in installing (wearing) the aforementioned apparatus is reduced when compared to the aforementioned first, second, and Third Embodiments which utilize a finger-ring-style sensor module. Furthermore, a power module such as a battery or the like is packaged into the wristwatch-style band WT4 as an electrical power source (not shown in the FIGS.).

According to the Fourth Embodiment of the present invention, a microphone is used in sensor SN. By means of this sensor SN, tones and vibrations generated at the time of performing finger-typing on a physical surface such as a floor, walls, upper thigh, or the like, can be detected. In this case, the characteristic indicators such as strength and frequency distribution of the tones and vibrations generated differ according to the structural components of each finger struck (i.e., skeleton, muscle, fat, etc.). Utilizing the difference in these characteristic amounts, analyzer PL4 detects which finger conducted key-typing (or combinations of a plurality of fingers) and then determines an output code CH. In the above case, the finger-typing pattern is determined by means of the same method as employed in the aforementioned First Embodiment.

According to the Fourth Embodiment, the determined output code CH is sent to portable information processing apparatus HH possessing a wireless receiver RX in the interior portion therein via weak-power radio wave transmitter TX. Furthermore, it is also possible to compact portable information processing apparatus HH and package this along with analyzer PL4 into wristwatch-style band WT4. In addition, besides a microphone, it is also possible to employ a strain gauge, pressure sensitive resistor, acceleration sensor, or other type of sensor such as a shock sensor as the aforementioned sensor.

[Fifth Embodiment]

Figure 22:
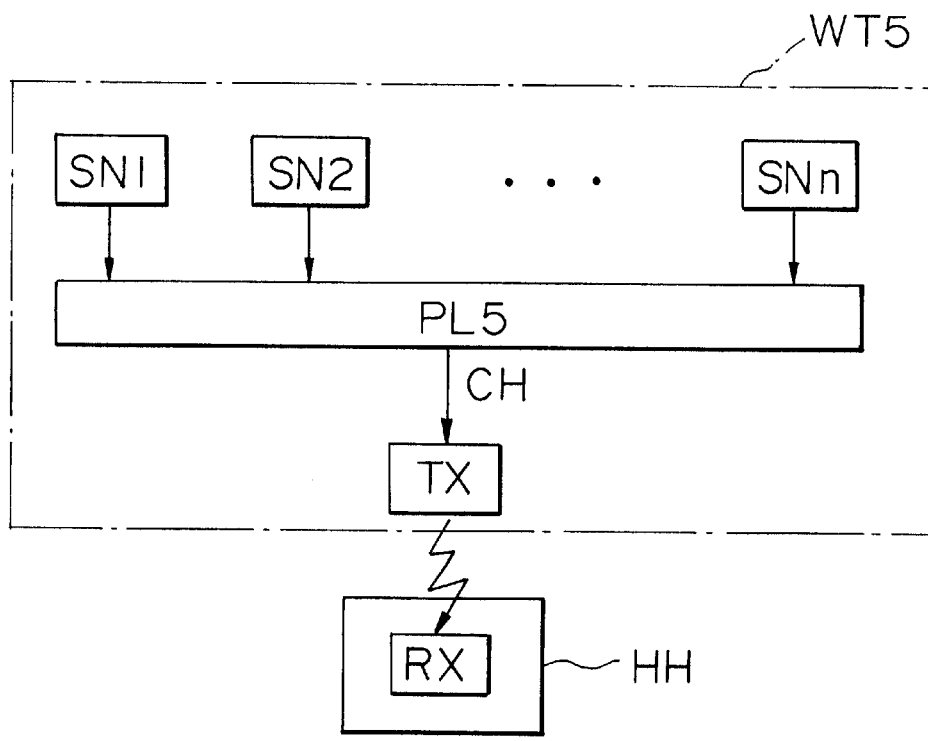
FIG. 22 is a block diagram showing a structural outline of a full-time wearable input device according to a Fifth Embodiment of the present invention.
Figure 21:
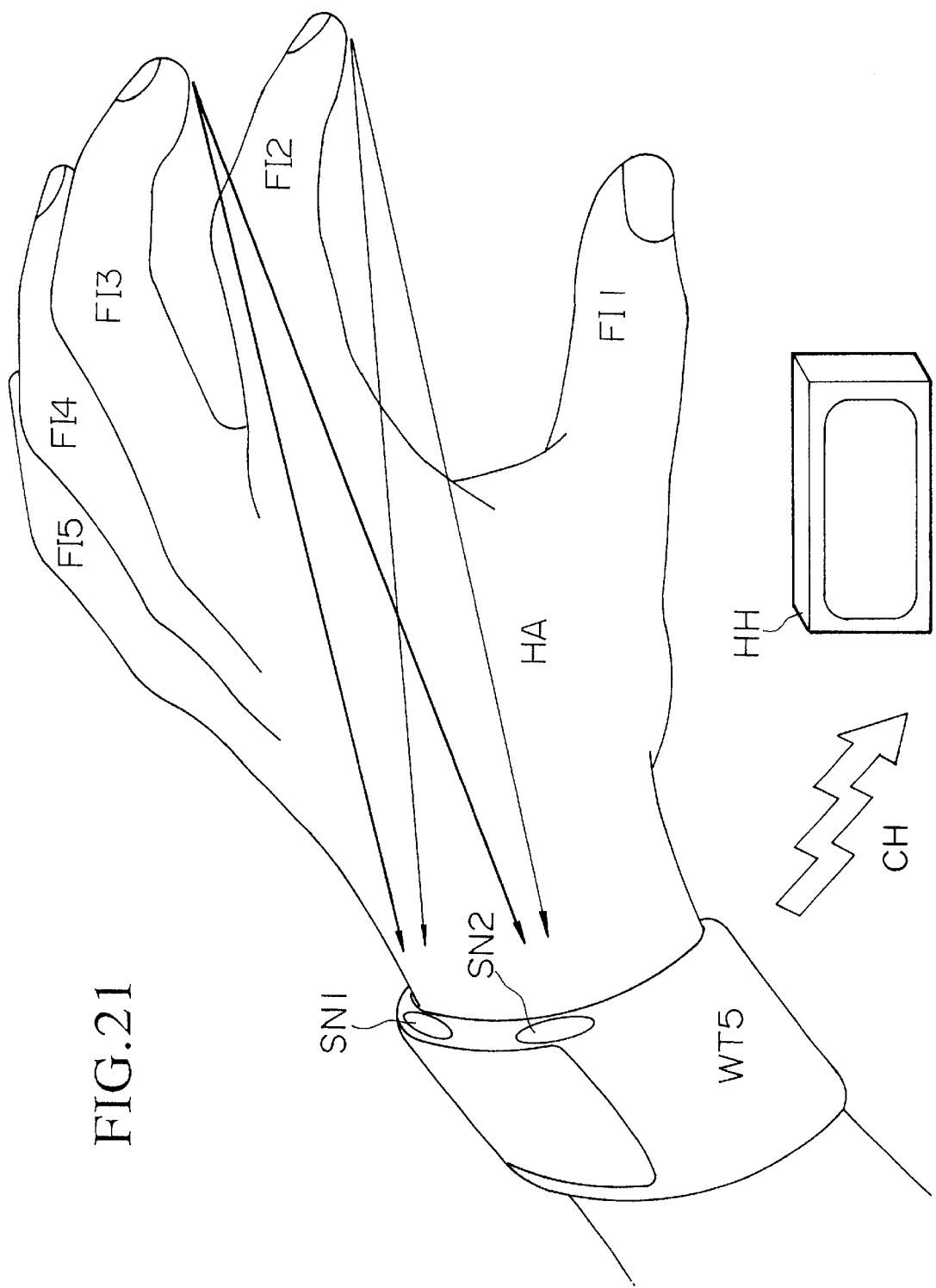
FIG. 21 shows a full-time wearable input device according to a Fifth Embodiment of the present invention in the case when the aforementioned full-time wearable input device is worn on the left hand.

FIG. 21 shows a full-time wearable input device according to a Fifth Embodiment of the present invention. This Fig. shows the case in which the full-time wearable input device is worn on the left hand. FIG. 22 is a block diagram showing a structural outline of the full-time wearable input device according to the Fifth Embodiment of the present invention.

In FIGS. 21 and 22, a left hand HA, fingers of the left hand FI1~FI5, shock sensors SN1, SN2, . . . SNn (2 or more), analyzer PL5, wristwatch-style band WT5, output code CH, weak-power radio wave transmitter TX, wireless receiver RX, and portable information processing apparatus HH are provided. Sensors SN1, SN2, . . . SNn are built into the wristwatch-style band WT5 along with analyzer PL5, and the entire structure is worn around the wrist. Consequently, according to the Fifth Embodiment of the present invention, the complication in installing (wearing) the aforementioned apparatus is reduced when compared to the aforementioned first, second, and Third Embodiments which utilize a finger-ring-type sensor module. Furthermore, a power module such as a battery or the like is built into the wristwatch-style band WT5 as an electrical power source (not shown in the FIGS.).

According to the Fifth Embodiment of the present invention, a microphone is used in sensors SN1, SN2, . . . SNn; these sensors SN1, SN2, . . . SNn, detect tones and vibrations generated at the time of finger-typing on a physical surface such as a floor, a wall, thigh, or the like. In the above case, the characteristic values such as the strength and frequency distribution of the tones and vibrations generated differ according to the differences in the structural components of each finger struck (i.e., skeleton, muscle, fat, etc.). In addition, the generation direction and position of the tones and/or vibrations can be specified by means of utilizing the difference in arrival times of the tones and vibrations, and the arrangement information of each sensor (arrangement of two or more sensors). Therefore, it is possible to achieve an even more precise discrimination of the key-typing finger by means of using the aforementioned information along with the characteristic amount described above. Analyzer PL5 detects the fingers which have performed key-typing (or combinations of fingers) by utilizing this difference in characteristic quantities, difference in arrival times of tones and vibrations, as well as the arrangement information of each sensor, and then determines an output code CH.

In the above case, the finger-typing pattern is determined by means of the same method as employed in the aforementioned First Embodiment.

According to the Fifth Embodiment, the determined output code CH is sent to portable information processing apparatus HH possessing a wireless receiver RX in the interior portion therein via weak-power radio wave transmitter TX. Furthermore, portable information processing apparatus HH can be made compact and packaged along with analyzer PL5 in wristwatch-style band WT5. Furthermore, in the aforementioned description, microphones were used as the sensor; however, it is also possible to employ a strain gauge, pressure sensitive resistor, acceleration and/or shock sensors.

[Sixth Embodiment]

Figure 23:
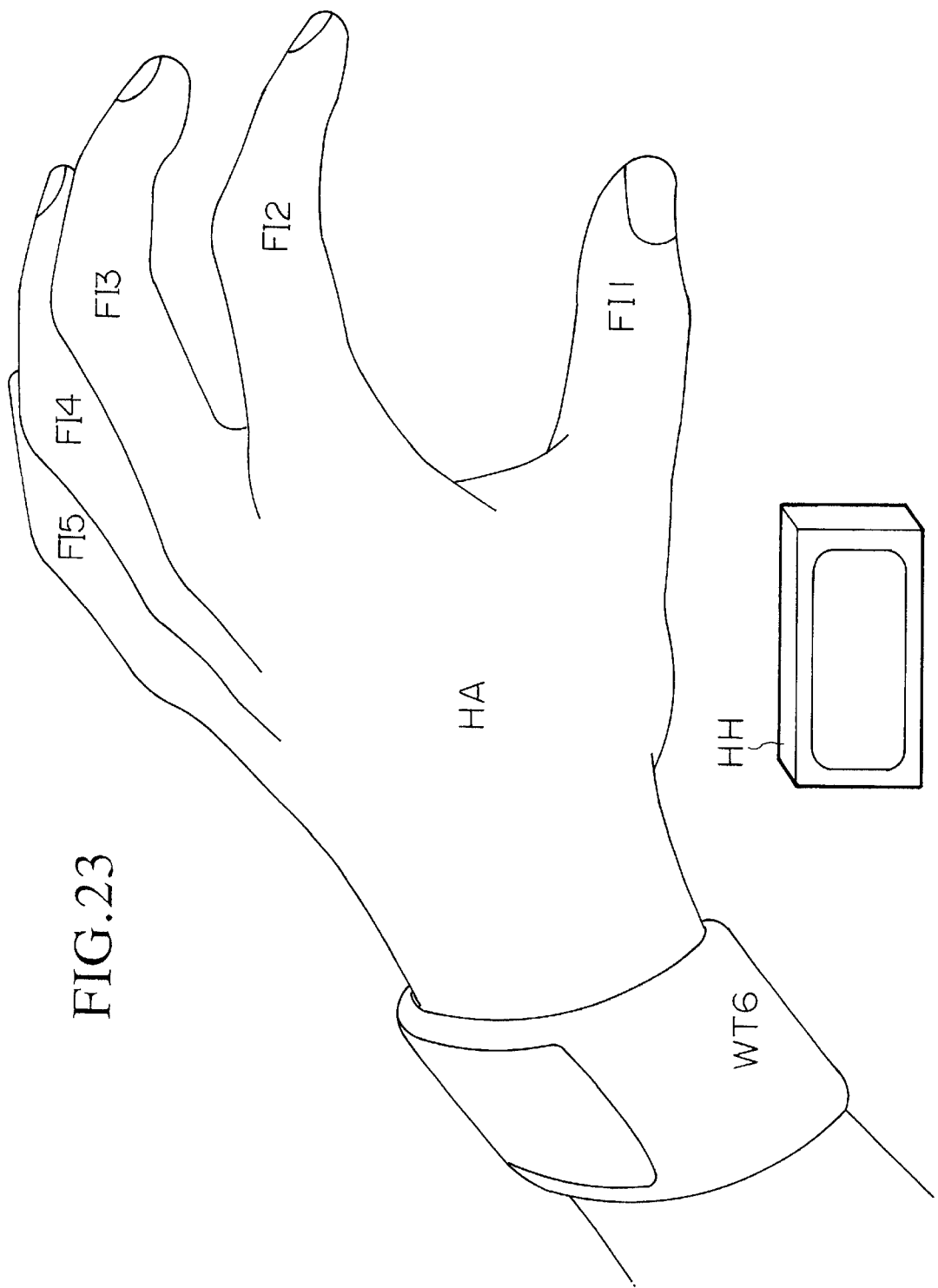
FIG. 23 shows a full-time wearable input device according to a Sixth Embodiment of the present invention in the case when the aforementioned full-time wearable input device is worn on the left hand.
Figure 24:
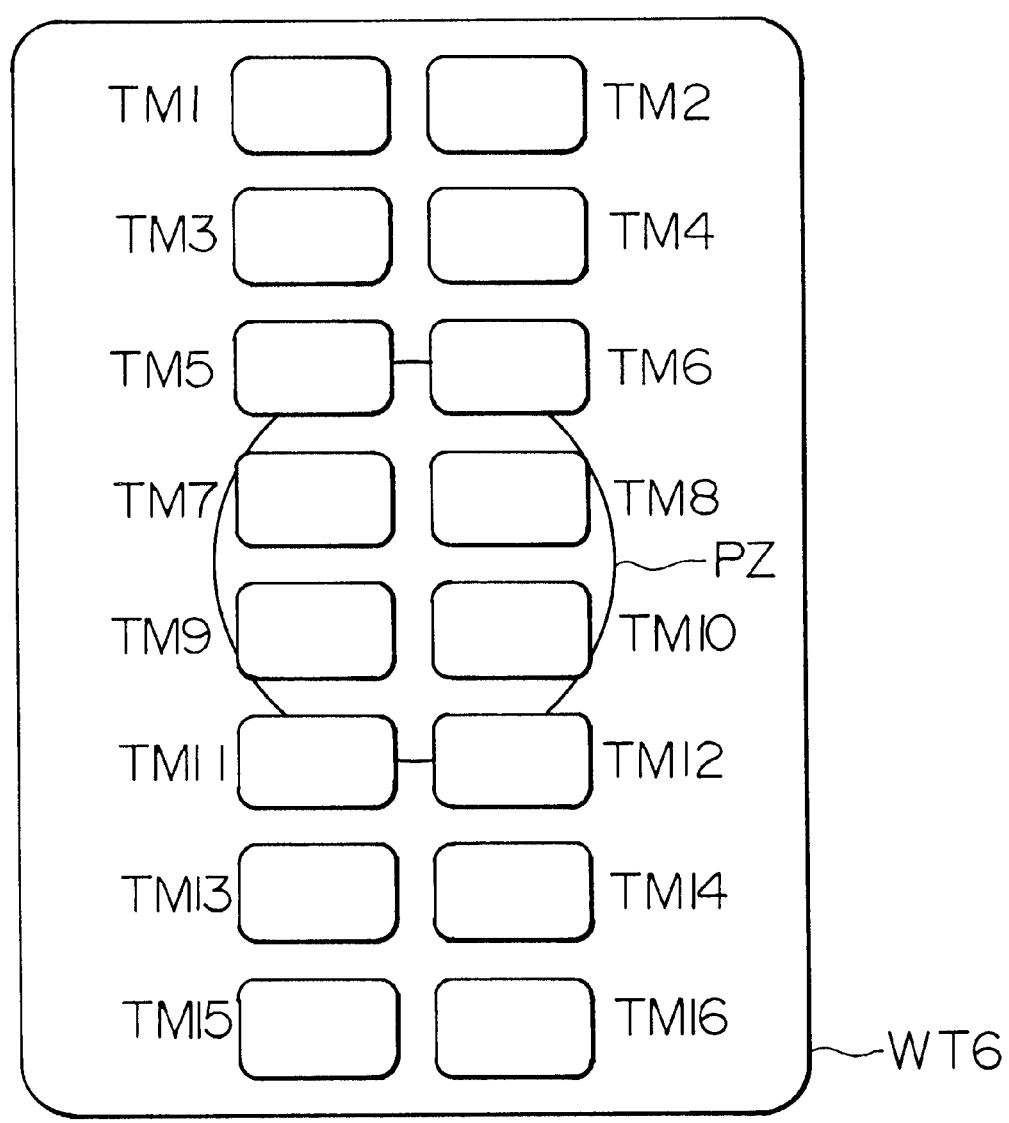
FIG. 24 shows an arrangement of matrix myoelectric signal sensors and a shock sensor according to a Sixth Embodiment of the present invention.
Figure 25:
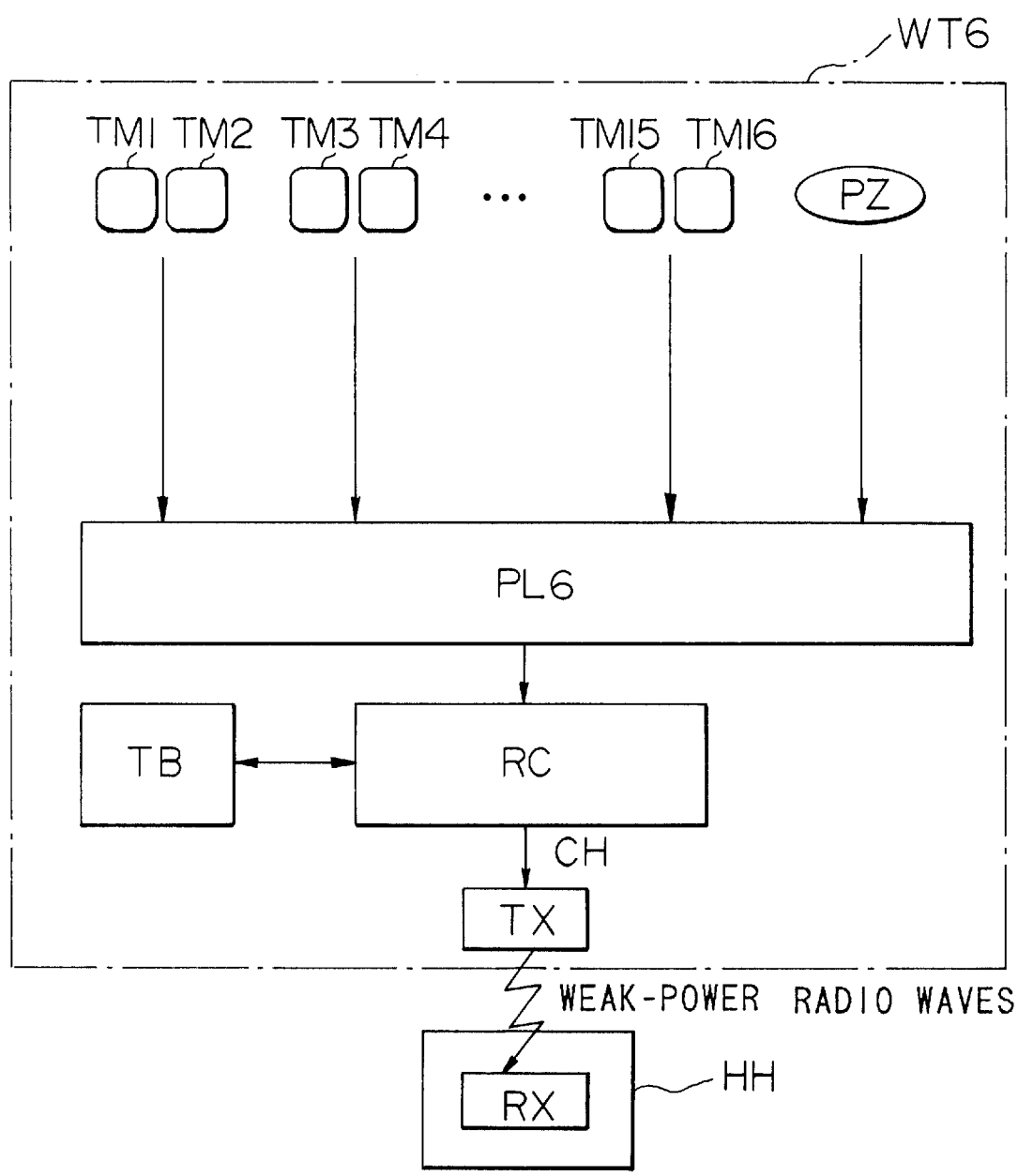
FIG. 25 is a block diagram showing a structural outline of a full-time wearable input device according to a Sixth Embodiment of the present invention.

FIG. 23 shows a full-time wearable input device according to a Sixth Embodiment of the present invention. This Fig. shows the case in which the aforementioned full-time wearable input device is worn on the left hand. FIG. 24 shows the arrangements of matrix myoelectric signal sensors and a shock sensor which are used in the Sixth Embodiment. This Figs. shows an open view of wristwatch-style band WT6 from the side in contact with the arm. FIG. 25 is a block diagram showing a structural outline of the full-time wearable input device according to the Sixth Embodiment. In FIGS. 23, 24, and 25, a left hand HA, fingers of the left hand FI1~FI5, wristwatch-style band WT6, portable information processing apparatus HH, matrix myoelectric signal sensors TM1~TM16, shock sensor PZ, analyzer PL6, discrimination portion RC, output code CH, weak-power radio wave transmitter TX, wireless receiver RX, and standard finger-typing pattern TB are provided. According the Sixth Embodiment, matrix myoelectric signal sensors TM1~TM16 are grouped with neighboring sensors paired together such that the electrical potential difference thereinbetween are measured. In addition, matrix myoelectric signal sensors TM1~TM16, shock sensor PZ, analyzer PL6, and discriminator RC are packaged into wristwatch-style band WT6 and worn around the wrist. Consequently, according to the Sixth Embodiment, the complication of installation is reduced when compared with the aforementioned first, second, and Third Embodiments which utilize finger-ring-type sensor modules. Furthermore, as with previous embodiments, a power module such as a battery is built into the wristwatch-style band WT6 as an electrical power source.

Figure 26:
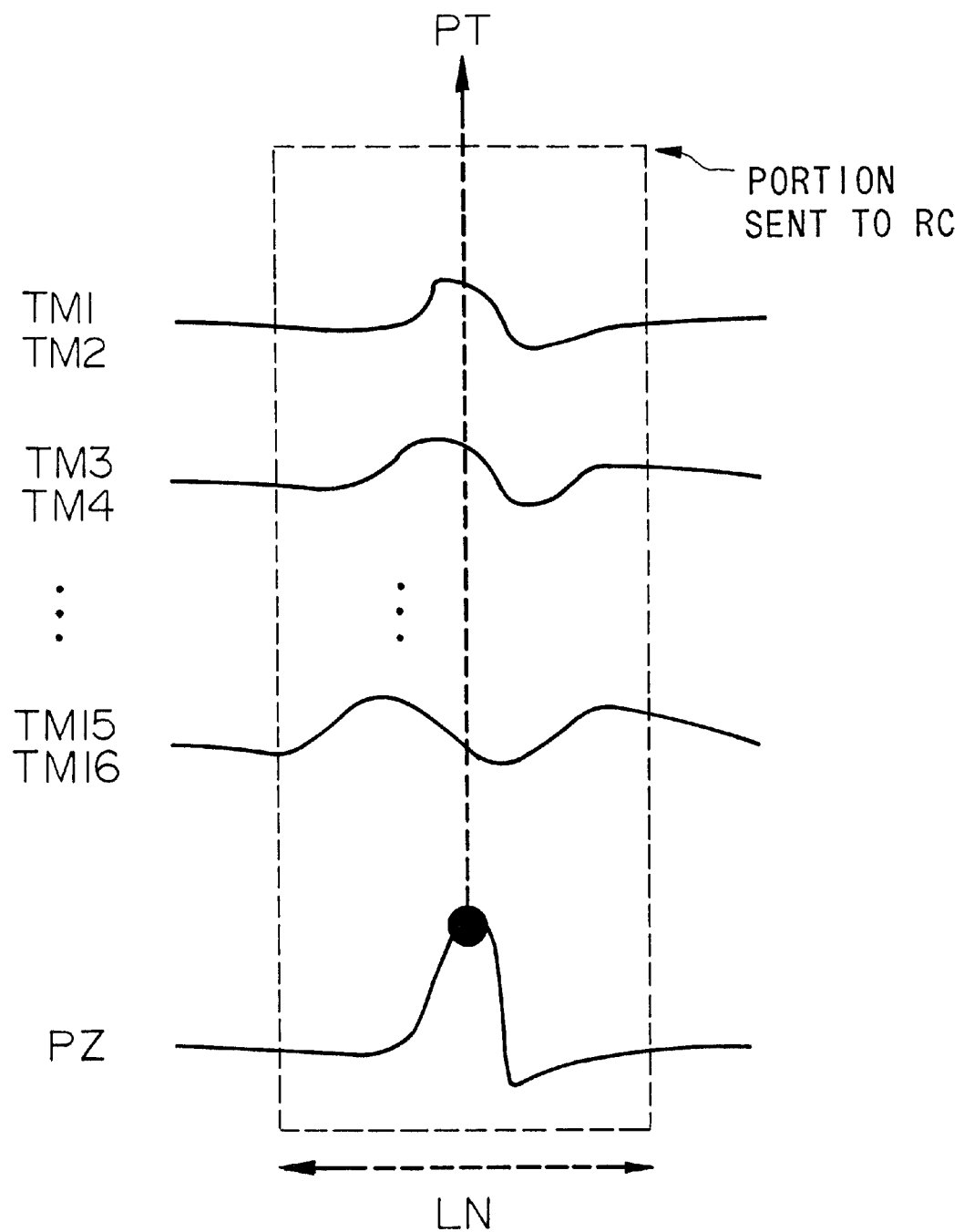
FIG. 26 is a diagram for use in explaining the actions of an analyzer and discriminator according to a Sixth Embodiment of the present invention.

In the following, the actions of the Sixth Embodiment will be described with reference to FIG. 26. FIG. 26 is a diagram for use in explaining the actions of analyzer PL6 and discriminator RC according to the Sixth Embodiment. At the time of finger-typing on a physical surface such as a floor, wall, thigh, or the like, the change in myoelectric potential and shock are detected by matrix myoelectric signal sensors TM1~TM16 and shock sensor PZ, respectively. The detected myoelectric signal and shock signal are then sent to analyzer PL6. From the shock signals sent by shock sensor PZ, analyzer PL6 detects the time PT of finger-typing, and then sends myoelectric signals and shock signals detected by means of the aforementioned matrix myoelectric signal sensors and shock sensor PZ within a time period LN incorporating this aforementioned time point PT to discriminator RC. In the discriminator RC, these signals are compared with previously set standard finger-typing patterns TB at each code, and an output code CH is then determined. The output code CH determined by means of the aforementioned discriminator RC is then sent to portable information processing apparatus HH possessing a wireless receiver RX in the interior portion therein via weak-power radio wave transmitter TX.

Furthermore, the number of matrix myoelectric signal sensors in the present embodiment is not restricted to 16, as it is also possible to provide an optional number of sensors in consideration of the detection precision desired.

[Seventh Embodiment]

Figure 27:
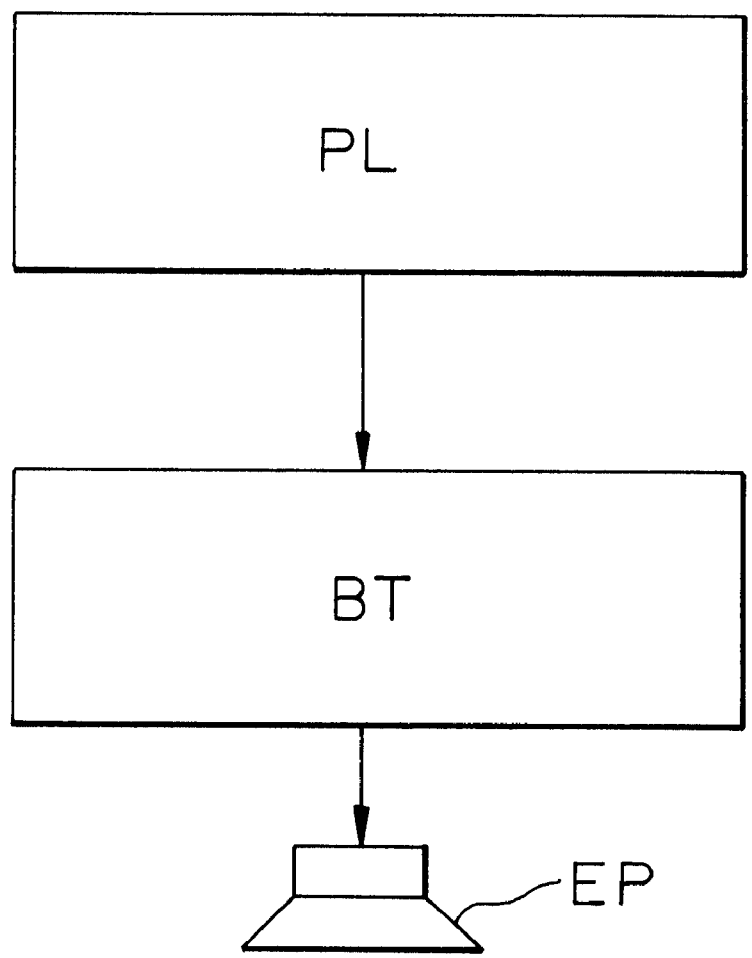
FIG. 27 is a block diagram showing the construction of an attachable musical feedback portion according to each of the aforementioned embodiments of the present invention.

According to the Seventh Embodiment of the present invention, a musical feedback function is added to the full-time wearable input devices according to the aforementioned first through Sixth Embodiments which allows the user to easily judge whether or not an appropriate input code was entered. FIG. 27 shows this musical feedback in accordance with the aforementioned embodiments. In FIG. 27, an analyzer PL is provided which corresponds to any of the aforementioned analyzers PL1~PL5 or analyzer RC. In addition, a musical feedback regulator BT is also provided. Analyzer PL transmits the finger-typing information of each finger before conversion into output code CH to musical feedback regulator BT. Musical feedback regulator BT converts this input information into scaler information and outputs it by means of sounding body EP shown in FIG. 27. In the following, a conversion example to scalar information is shown.

TABLE 1

| Thumb | Do (C3) |
| Index finger | Re (D3) |
| Middle finger | Mi (E3) |
| Ring finger | Fa (F3) |
| Small finger | So (G3) |

The conversion table corresponding to Table 1 is previously recorded into musical feedback regulator BT. Consequently, as described in the aforementioned, by means of performing musical feedback, the user can confirm finger-typing actions by means of tones, and decide whether or not the appropriate input code has been entered. In addition, it is also possible to simultaneously convey the state of the system, i.e., mode of key input with respect to the user by means of appropriately varying the height and tone color of each tone. Furthermore, in FIG. 27, regulation of musical feedback portion BT is performed by means of analyzer PL; however, it is also possible to perform simultaneous regulation by means of portable information processing apparatus HH.

[Eighth Embodiment]

Figure 28:
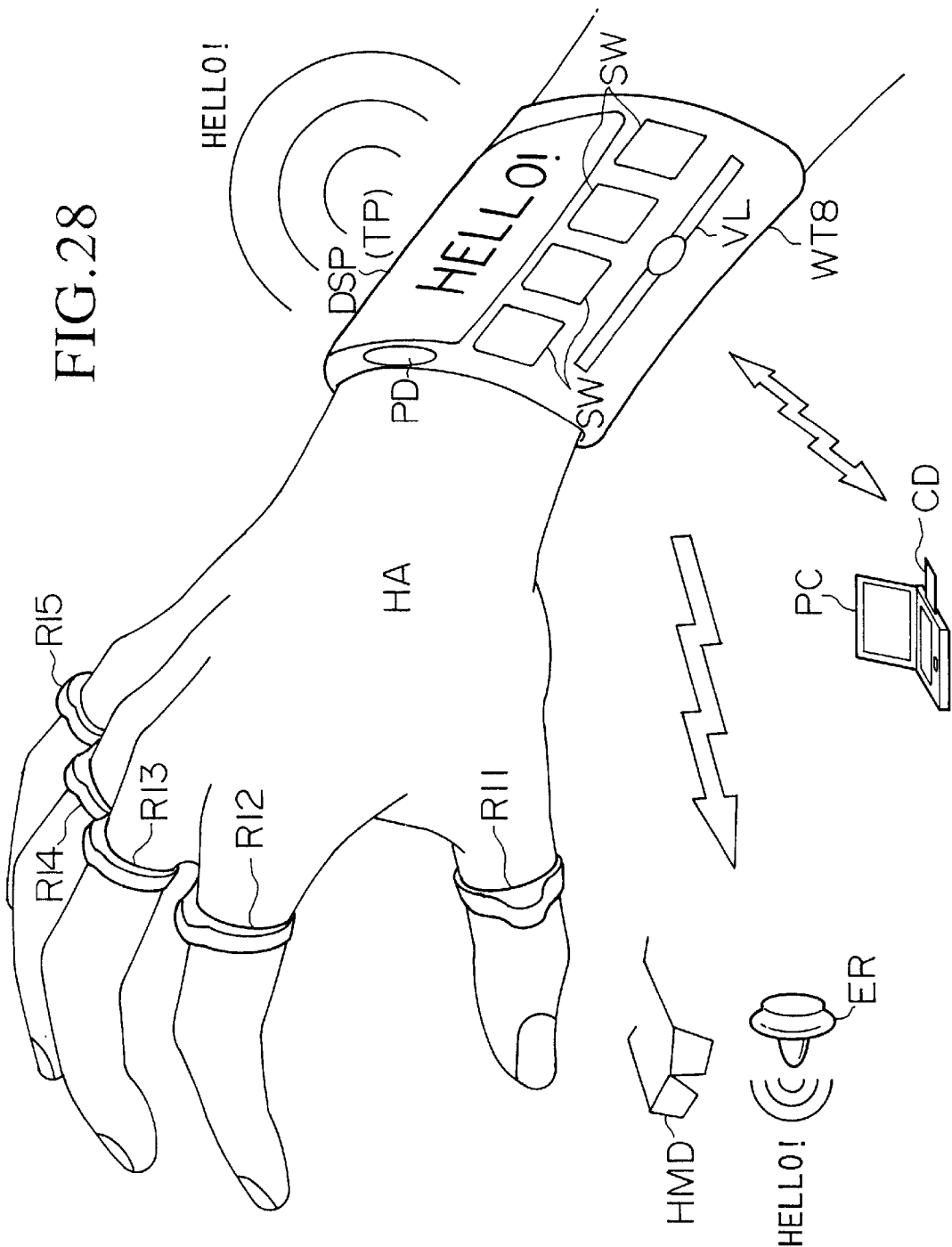
FIG. 28 shows a full-time wearable communication apparatus according to an Eighth Embodiment of the present invention.
Figure 29:
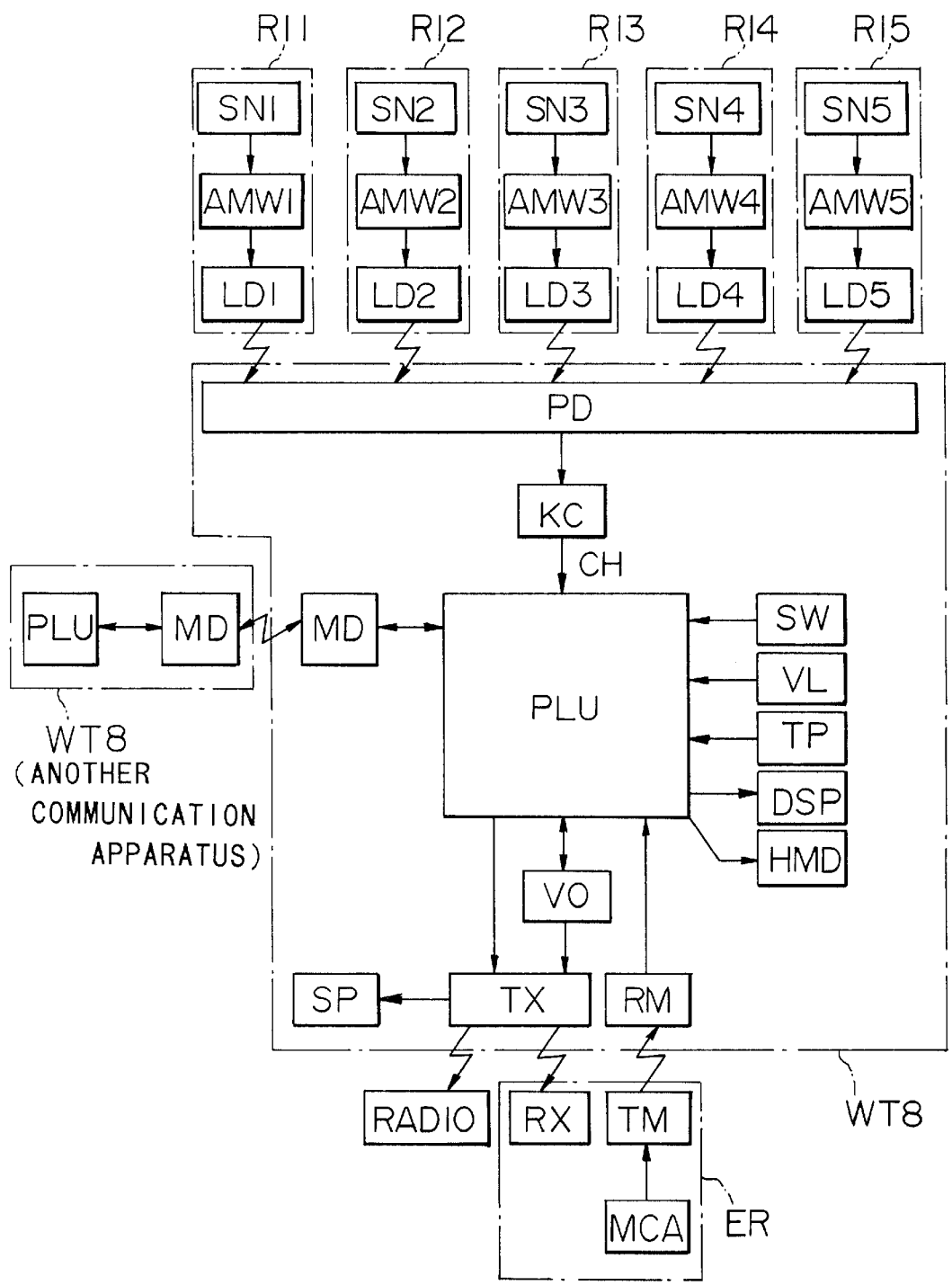
FIG. 29 is a block diagram showing a structural outline of a full-time wearable communication apparatus according to an Eighth Embodiment of the present invention.

According to the Eighth Embodiment of the present invention, a full-time wearable input device is applied as an input device for a full-time wearable communication apparatus. FIG. 28 shows a full-time wearable communication apparatus according to an Eighth Embodiment of the present invention. FIG. 29 is a block diagram showing a structural outline of the full-time wearable communication apparatus according to the Eighth Embodiment.

In FIGS. 28 and 29, a right hand HA, finger-ring-type sensor modules R11~R15 which include sensors SN1~SN5, signal amplifiers AMW1~AMW5, light signal generators LD1~LD5, respectively, as previously described, and wristwatch-style band WT8, are provided. In wristwatch-style band WT8, light receptor PD, key code analyzer KC, information processor PLU, speech synthesizer VO, display DSP, touch panel TP mounted on display DSP, switch SW, slider VL, speaker SP, weak-power radio wave transmitter TX, wireless receiver RM, and data communication device MD are provided. In addition, wireless earphone ER, internal bone conduction microphone MCA, wireless receiver RX for weak-power radio wave transmitter TX, weak-power radio wave transmitter TM for wireless receiver RM, lightweight spectacle-type head-mounted display HMD, exterior information processing apparatus PC, and an extension card CD (e.g., PCMCIA standard) which is inserted and used in the aforementioned information processing apparatus PC. Furthermore, as will be explained hereafter, information processing apparatus PC is not always necessary, and hence is omitted from FIG. 29.

Speech synthesizer VO, weak-power radio wave transmitter TX, and data communication device MD are built into extension card CD. Furthermore, although not shown in the FIGS., a power module such as a battery is included in each of finger-ring-type sensor modules R11~R15, wristwatch-style band WT8, and wireless earphone ER as an electrical power source.

By means of the finger-typing actions of the user, light pulses are outputted from light signal generator LD. These actions are explained in the aforementioned First Embodiment and thus will be omitted in the following.

The light pulse outputted from light signal generator LD1~LD5 is received by light receptor PD which is packaged into wristwatch-style band WT8. The signal received by light receptor PD is then inputted into keycode analyzer KC, and an output code CH is then determined. At this point, analyzer KC corresponds to analyzer PL1 of the First Embodiment; the method for determining the finger-typing pattern is the same as the method employed in the aforementioned First Embodiment.

According to the full-time wearable communication apparatus according to the Eighth Embodiment, key-typing information is transmitted by means of light communication using finger-ring type sensor modules R11~R15. In addition, it is possible to use an extremely fine signal line so as not to hinder daily life (i.e., wearing of the apparatus). In the aforementioned case, in order to protect the signal lines, it is preferable to use a glove-like outfitting with the finger tips cut off. Furthermore, it is possible to use any of the full-time wearable input devices disclosed in the aforementioned first through Seventh Embodiments as the input device of the Eighth Embodiment. According to the full-time wearable communication apparatus of the present embodiment, the user can carry out communication by means of vocalizing sentences formed by key input using key-typing. These sentences are vocalized from speaker SP using speech synthesizer VO. In addition, besides forming sentences by means of character input, it is also possible to form sentences by a more rapid process by means of selecting frequently used vocabulary and phrases from a menu. Furthermore, it is also possible to form sentences more precisely by means of displaying these sentences during formation or the information at the time of menu selection using a display DSP, and then transmitting this information to an earphone ER via a weak-power wireless transmitter TX. In this case, it is possible to use weak-power radio waves as in commercial radios (FM or AM) to transmit the above information to a speaker SP or earphone ER. In the case when a loudspeaker is necessary such as during a lecture or the like, it is possible to use a conventional radio receiver or the like.

Furthermore, it is also possible to facilitate information input at the time of menu selection and/or sentence formation by means of installing a touch panel TP with the display DSP. In addition, it is also possible to inspect the menu incorporating images and Figs. by means of jointly employing a compact, light-weight, head-mounted display HMD. However, this type of display occupies a portion of the user's vision as the above information is displayed over a portion of the viewer's range of vision, and thus may be slightly inconvenient. Therefore, it is preferred that the aforementioned display be switched on and used only at the time of operating the input device.

In addition, it is also possible to control sentence formation and the like using speech by installing a bone-conduction-type microphone MCA in the inner portion of earphone ER, and providing a speech recognition function in information processing apparatus PLU. In the case when a speech recognition function is not provided, it is possible to utilize the apparatus for the services of speech memos and hand-free headset telephones or the like.

The slider VL packaged into wristwatch-style band WT8 is mainly used for controlling the sound volume of speaker SP; it may also be used in switching of the action mode as well as input. Switch SW can be used in the switching of each type of action mode including the switching of action/non-action of the system itself, as well as in input. Other options include performing switching of each action mode including switching of action/non-action of the system itself by means of key-typing action using combinations of specific fingers. In this case, it is possible to control quickly the actions of the system using one hand without having to reach and activate the switch for each action.

The construction of sentences, as well as the operation of the menu are performed by means of information processing apparatus PLU. According to the full-time wearable communication apparatus of the Eighth Embodiment, information processing apparatus PLU is provided in wristwatch-style band WT8; however, it is also possible to provide the information processing apparatus PLU as an independent device in, for example, a pocket or bag. In this case, it is necessary to transmit the data in a wireless manner (or optionally, by using wires). With regard to an earphone for use in feedback, a wireless device is preferred; however, it is also possible to use wires as long as they do not hinder daily wearing of the device. As an external information processing apparatus PLU, it is possible to employ a conventional portable information terminal PC as shown in FIG. 28. In this case, functions not included in a conventional portable terminal, namely, speech synthesizer VO, earphone ER, weak-power radio wave transmitter TX to speaker SP, and data communication device MD for controlling key codes and commands may be packaged into an extension card such as a PCMCIA standard, or a plurality of extension cards to enable communication to take place by simply inserting or ejecting the aforementioned extension card CD by means of a slot. In addition, it is also possible to install control software into the aforementioned extension card CD.

Figure 30:
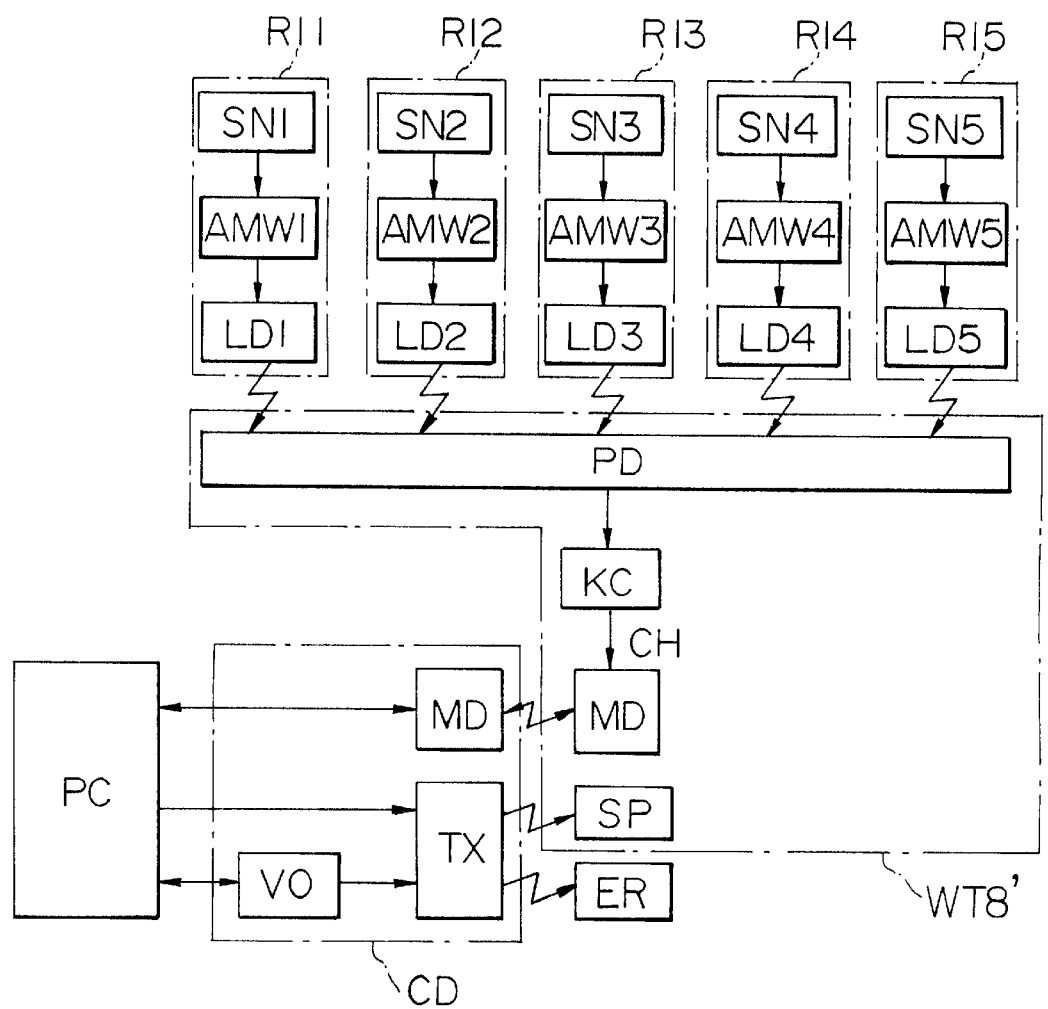
FIG. 30 is a block diagram showing a minimum structure in the case when a general portable information terminal PC is used as an exterior information processing apparatus PLU in the full-time wearable communication apparatus according to an Eighth Embodiment of the present invention.

FIG. 30 is a block diagram showing the minimum structure in the case when the conventional portable information terminal PC is used as an external information processing apparatus PLU according to a full-time wearable communication apparatus of the Eighth Embodiment. It is also possible for a plurality of users to interact using the full-time wearable communication apparatus according to the Eighth Embodiment.

Figure 31:
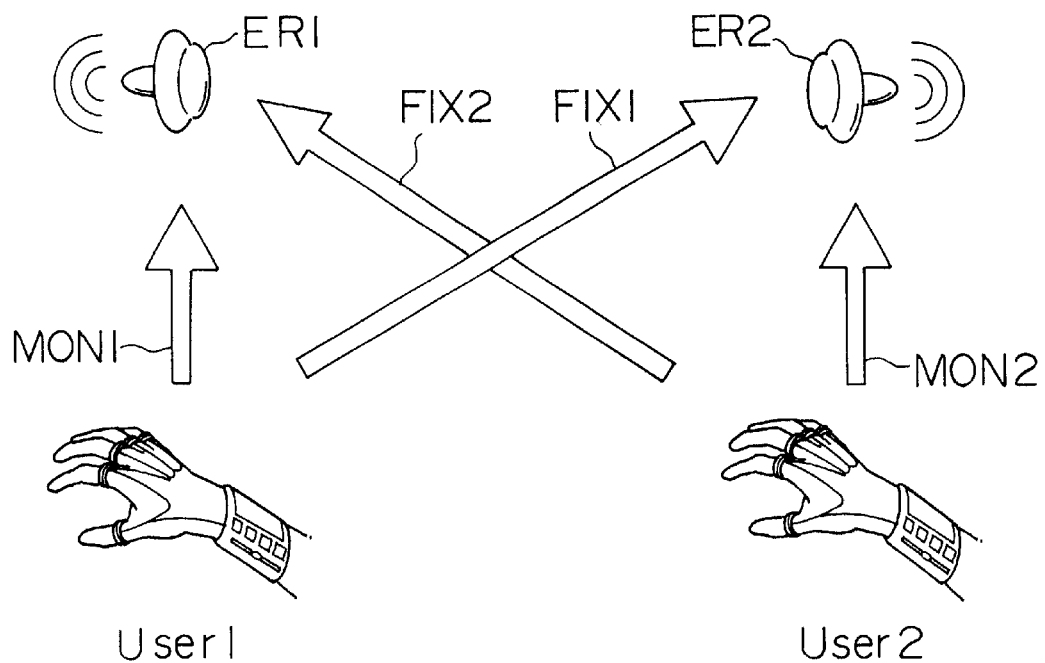
FIG. 31 is a diagram showing the interaction scenario in the case when a plurality of full-time wearable communication apparatuses according to an Eighth Embodiment of the present invention are used.
Figure 32:
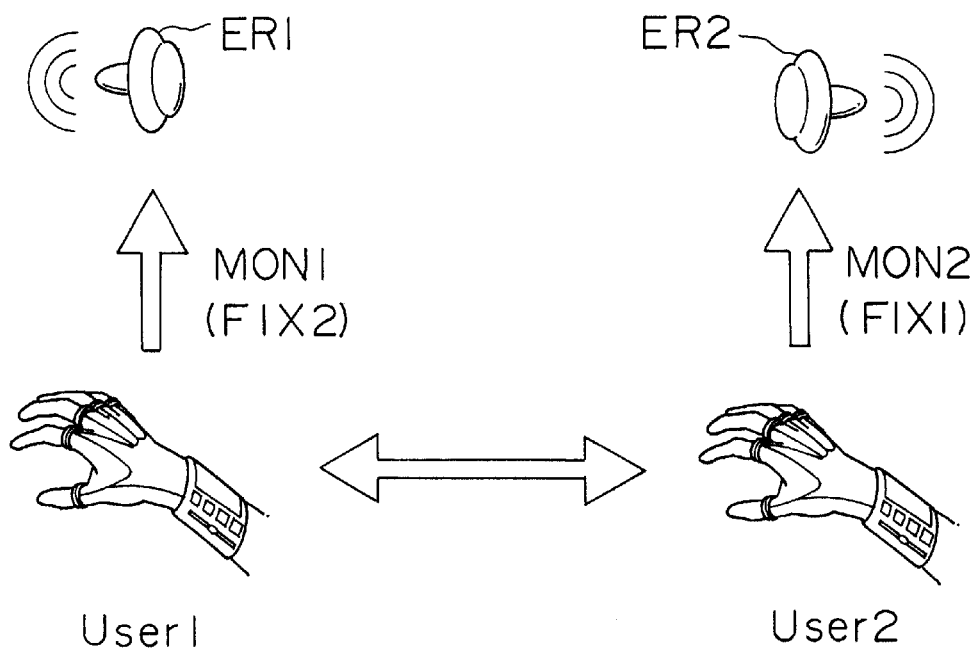
FIG. 32 shows a situation in which interaction is performed using a plurality of full-time wearable communication apparatuses according to an Eighth Embodiment of the present invention.

FIGS. 31 and 32 show a situation in which a plurality of full-time wearable communication apparatuses are used according to the Eighth Embodiment of the present invention. In this case, use of a speaker serves as a nuisance to those around, as well as causes potential loss of the security of the information, and thus transmission of the information is performed using speech or data communication by means of an earphone or a display.

FIG. 31 shows an example of interaction (conversation) by means of transmission of constructed sentences to the earphone of the opposite party. In FIG. 31, MON represents feedback speech which is transmitted back to one's own earphone ER for monitoring the sentences as they are being constructed, while FIX indicates the flow of speech read out from complete sentences vocalized from the earphone ER of the opposite party. In the case when interaction is being performed by a plurality of users it is possible to avoid random conversation by means of appropriately setting and regulating the reception channel, system ID, session ID, and the like with respect to each individual earphone ER such that communication only with the desired partner is achieved.

FIG. 32 shows an example of interaction performed by expressing constructed sentences on the opposite party's display by means of data communication.

Furthermore, the characters displayed can be converted into speech and transmitted to the earphone of the opposite party. In FIG. 32, MON refers to the feedback speech during construction of the sentences, while FIX refers to the flow of speech upon reading completed sentences. As in the aforementioned, interference can be avoided by means of appropriately regulating the receiving channel of data dispatch and each earphone ER, system ID, and session ID so as to achieve communication with the desired party. In addition, it is also possible to connect the full-time wearable communication apparatus according to the Eighth Embodiment to an exterior machine such as an ordinary computer or communication machine.

Figure 33:
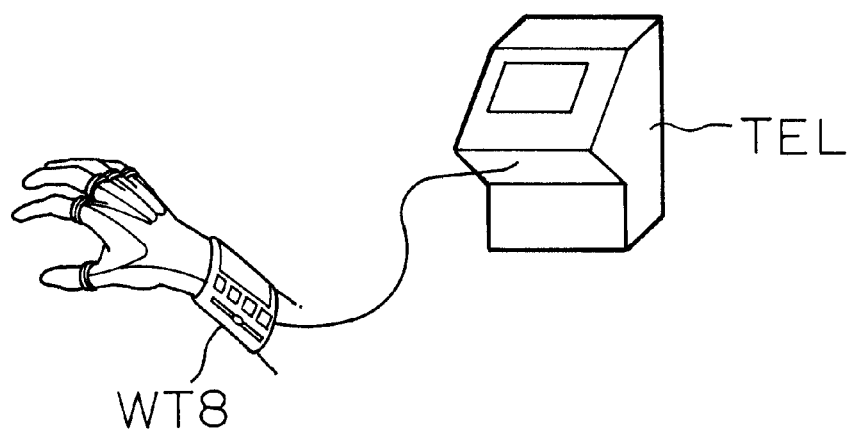

FIG. 33 shows a situation in which the full-time wearable communication apparatus according to the Eighth Embodiment is connected to a telephone TEL such as a public telephone which serves as an exterior machine. In this aforementioned case, it is possible for the speech-impaired to conduct a conversation using a public telephone, conventional telephone, or the like. Furthermore, in FIG. 33, wristwatch-style band WT8 and telephone TEL are connected using a communication signal line; however, it is also possible to conduct the conversation by directly applying a speaker SP provided in wristwatch-style band WT8 to the receiver of the telephone TEL. In addition, it is also possible to connect the aforementioned components in a wireless manner. Furthermore, it is similarly possible to provide a telephone function in the full-time wearable communication apparatus of the Eighth Embodiment.

The object of the full-time wearable communication apparatus according to the present embodiment is to serve as a device for use in the interaction of speech-impaired persons with persons possessing normal speech function; however, this device can sufficiently function also as a portable information processing apparatus for general use. In this case, it is possible to access an address record, telephone directory, daily planner, electronic book, electronic newspaper reader, and the like, anytime, anywhere and immediately. Besides the aforementioned, it is also possible to access external databases and host computers and conduct automatic data synchronization by means of installing a communication/dispatch function. In addition, it is also possible to use the aforementioned device as a hands-free portable telephone.

[Ninth Embodiment]

The Ninth Embodiment of the present invention exhibits an example of the case when the full-time wearable input device according to the present invention is applied as a full-time wearable musical keyboard device.

Figure 34:
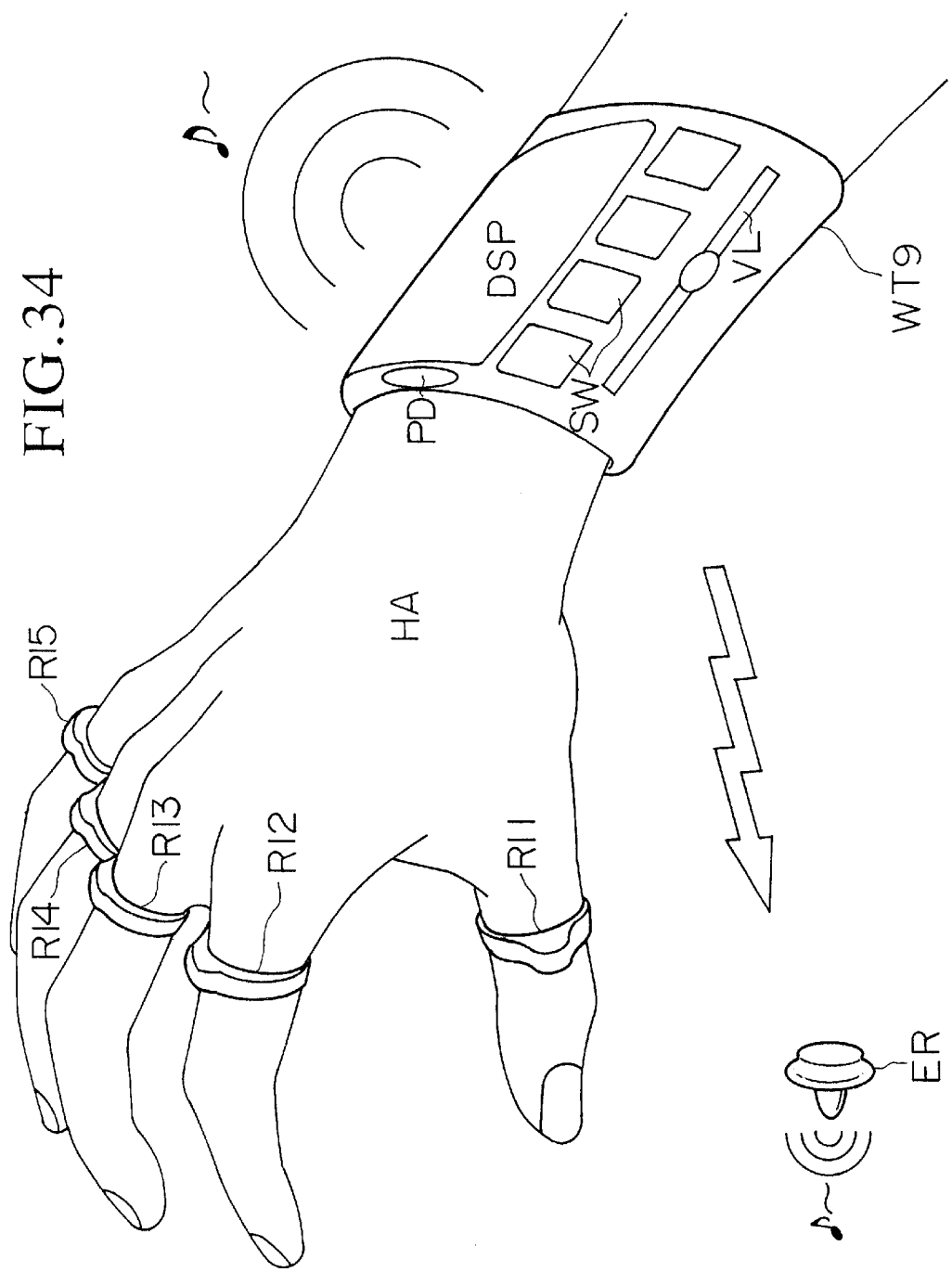
FIG. 34 shows a full-time wearable musical keyboard apparatus according to a Ninth Embodiment of the present invention.
Figure 35:
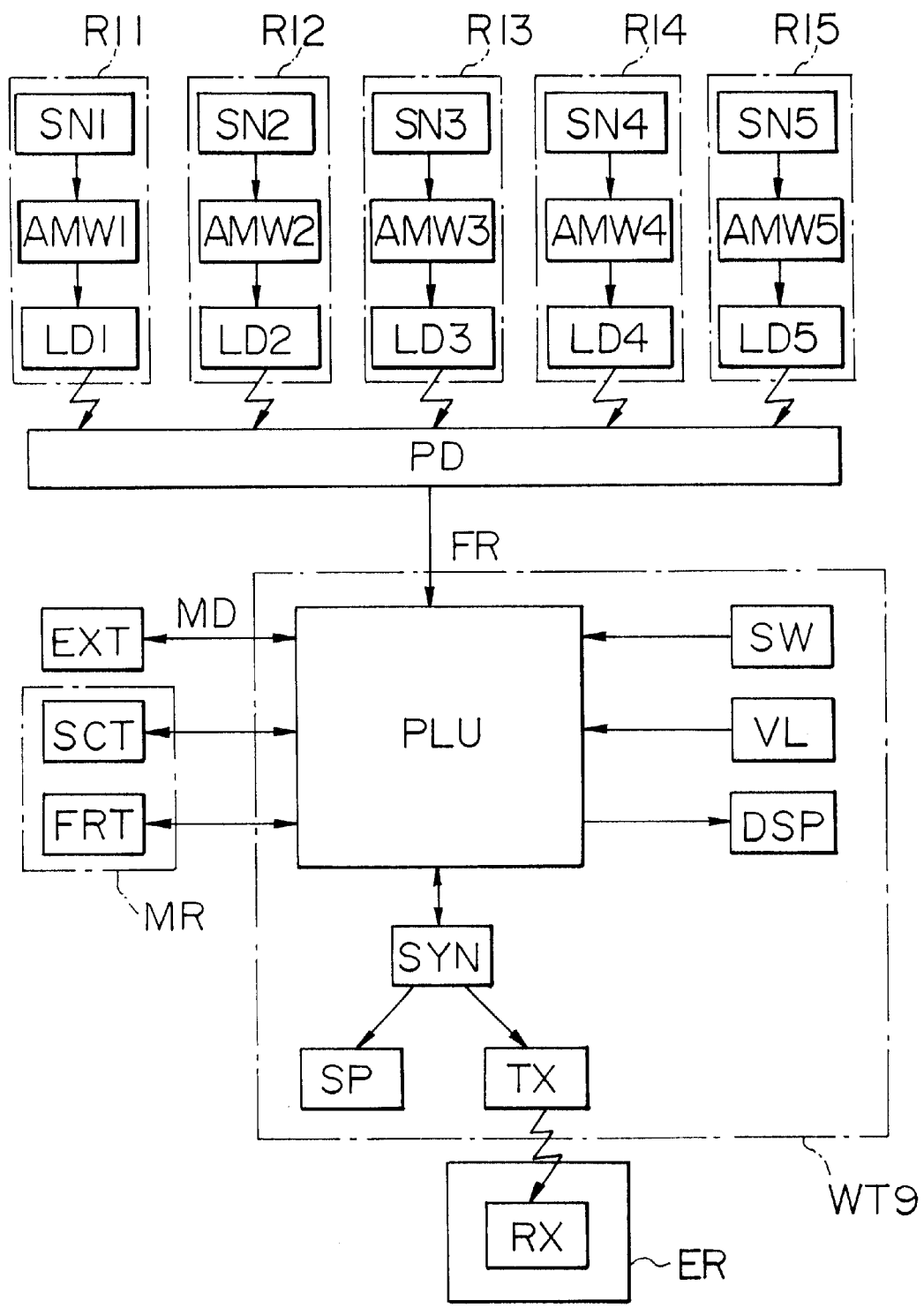
FIG. 35 is a block diagram showing a structural outline of a full-time wearable musical keyboard apparatus according to a Ninth Embodiment of the present invention.

FIG. 34 shows an external view of a full-time wearable musical keyboard apparatus according to the Ninth Embodiment of the present invention. FIG. 35 is a block diagram showing a structural outline of the full-time wearable musical keyboard apparatus according to the Ninth Embodiment.

In FIGS. 34 and 35, a right hand HA, finger-ring-type sensor modules RI1~RI5 as shown in FIGS. 1 and 23, and wristwatch-style band WT9, are provided. In addition, light receptor PD, information processor PLU, display DSP, switch SW, slider VL, music generator SYN, speaker SP, musical score table SCT, and memory MR in which fingering table FRT is recorded, are packaged into wristwatch-style band WT9. As described above, wristwatch-style band WT9 is worn around the wrist portion. Furthermore, an external musical processor EXT is provided and the aforementioned wristwatch-style band WT9 can perform communication of the musical tone information with the musical processor EXT via a standard interface such as an MIDI or the like. Furthermore, a wireless earphone ER possessing a wireless receiver RX is also provided. Although not shown in the Figures, a power module such as a battery or the like is built into each of the finger-ring-type sensor modules R11~R15, wristwatch-style band WT9 and wireless earphones ER as an electric power source. According to the Ninth Embodiment, the transmission action of a light pulse occurs as described in the aforementioned via shock sensors SN1~SN5, signal amplifiers AMW1~AMW5, and light signal generators LD1~LD5 in accordance with finger typing actions, hence a description will be omitted.

Light pulses from light signal generators LD1~LD5 are received by means of light receptor PD built into wristwatch-style band WT9, and the signal which is received by this light receptor PD is then transmitted to processor PLU as finger typing information FR. In the above case, the method for determining the finger typing pattern is identical to the method employed in the aforementioned First Embodiment.

According to the Ninth Embodiment, key typing information is transmitted by means of light communication using finger-ring-type sensor modules R11~R15; however, it is also possible to use a fine signal line which does not hinder daily wear. In this case, in order to protect the signal line, it is preferable to use an outfitting such as a glove with the fingertips cut off. In addition, as the input device of the present embodiment, it is possible to use, optionally, any of the full-time wearable input devices disclosed in the aforementioned First through Seventh Embodiments. The user can then perform music by means of carrying out finger typing on any available physical surface such as on a thigh, knee, or the like through the conversion actions described hereafter.

The music which is performed is fed back through the wireless earphone ER. In addition, it is also possible to vocalize the music performed via a speaker SP or the like. In this case, as with a commercial radio (FM or AM) transmission to speaker SP or earphone ER is conducted using weak-power radio waves. In the case when a loudspeaker is necessary such as at a seminar or the like, a conventional radio can be used.

Slider VL which is packaged into wristwatch-style band WT9 can be used principally in the control of sound volume of speaker SP. However, in addition, this slider VL can be used in various inputs such as switching of action modes and the like. Switch SW can be used in inputs such as in the inputs of various action modes including switching of action/non-action of the system itself, as well as in menu selection. Besides the aforementioned, it is also possible to conduct switching of various action modes including switching of the action/non-action of the system itself using key typing action by means of various combinations of specific fingers. In this case, it is possible to quickly control the action of the system with one hand without having to reach out and touch the switch for each action. In addition, information at the time of menu selection can be displayed on display DSP. Furthermore, it is possible to both send and receive music data to and from an exterior musical processing device using a standard interface such as MIDI or the like. In this manner, ensembles created by multiple persons can also be achieved. According to the Ninth Embodiment of the present invention, scores of multiple songs and data of typical fingering patterns are maintained in score table SCT and fingering table FRT, respectively; hence, by means of specifying a song before the performance, the relationship between finger-typing and the notes to be generated are made clear. That is, the notes to be performed are determined by means of the score table SCT and the selected note is performed if the typed finger pattern is mentioned in the corresponding fingering table FRT.

FIG. 36 shows an example of a fingering table FRT according to the Ninth Embodiment. This fingering table is determined based on absolute specific actions, relative specific actions, or combinations of these actions. Absolute specification refers to the fingers pressed as well as combinations therein. On the other hand, relative specification corresponds to determining whether the position of a subsequently pressed finger lies to the left side or the right side and the distance therein by means of using the position of the finger currently being pressed as a reference. In this manner, variations such as "right (or left) of current finger", "current position and right (or left) of current finger", "one position to the right (or left) side of current position", "both neighboring fingers of current position", and the like can be considered.

In the case of performing a certain song, the fingering is strictly determined; however, under normal circumstances, the fingering when various persons perform a certain song is slightly different. As explained above, by means of combining absolute and relative specifications, it is possible to impart an element of softness to the fingering, eliminate random fingering, and reduce the capacity of the fingering table in memory. FIG. 36 shows a song expressed by a series of "notes". The cursor for use in performing indicates a position of "Time =1" at the time when a song is selected. When the pattern of the finger-typed finger is mentioned in the corresponding "fingering" column, the note mentioned in the "note" column at the cursor position is performed, and the cursor then progresses one phase lower. Furthermore, in the aforementioned figure, the length of the sound is not specified.

In the "fingering" column of FIG. 36, the numerals "1•2•3•4•5" represent an absolute specification respectively corresponding to "thumb•index finger•middle finger•ring finger•little finger". Combinations formed from a plurality of numerals represent the theoretical sum of these fingers (e.g., "1 2" represents "thumb and index finger"). Furthermore, the symbol "*" represents "all fingers" and hence is equivalent to "1 2 3 4 5". In the same figure, "<•>" represent an example of relative specification: these symbols indicate "to the right side of finger currently conducting finger-typing" and "to the left side of finger currently conducting finger-typing," respectively.

In other words, according to the Ninth Embodiment, it is possible to specify the fingering using "absolute specification" in which finger-typing of only specified fingers is possible, and "relative specification" which is derived from the current finger-typing situation. Three fingering modes are designated in fingering table FRT shown in FIG. 36. The first mode "precise" refers to the "precise" column indicating a certain position of the cursor. In this mode, the valid finger pattern is narrowest, and hence this mode is mainly used for the fingering practice of a musical instrument. The second mode "simple" imparts an element of softness to the finger pattern and allows for a more lighthearted performance. In the third mode "one finger", the subsequent note is designed to be generated regardless of which finger performs finger-typing. In this manner, even persons who cannot operate a keyboard can enjoy music. Furthermore, besides the melody line played by the user, it is also possible to achieve an even greater reality by storing sounds such as rhythms or accompaniments in the score table and generating these sounds at the same time. In the Ninth Embodiment of the present invention, a keyboard-type musical instrument is principally discussed; however, it is also possible to apply the present embodiment to other musical instruments such as string, wind, or percussion instruments.

[Tenth Embodiment]

Figure 37:
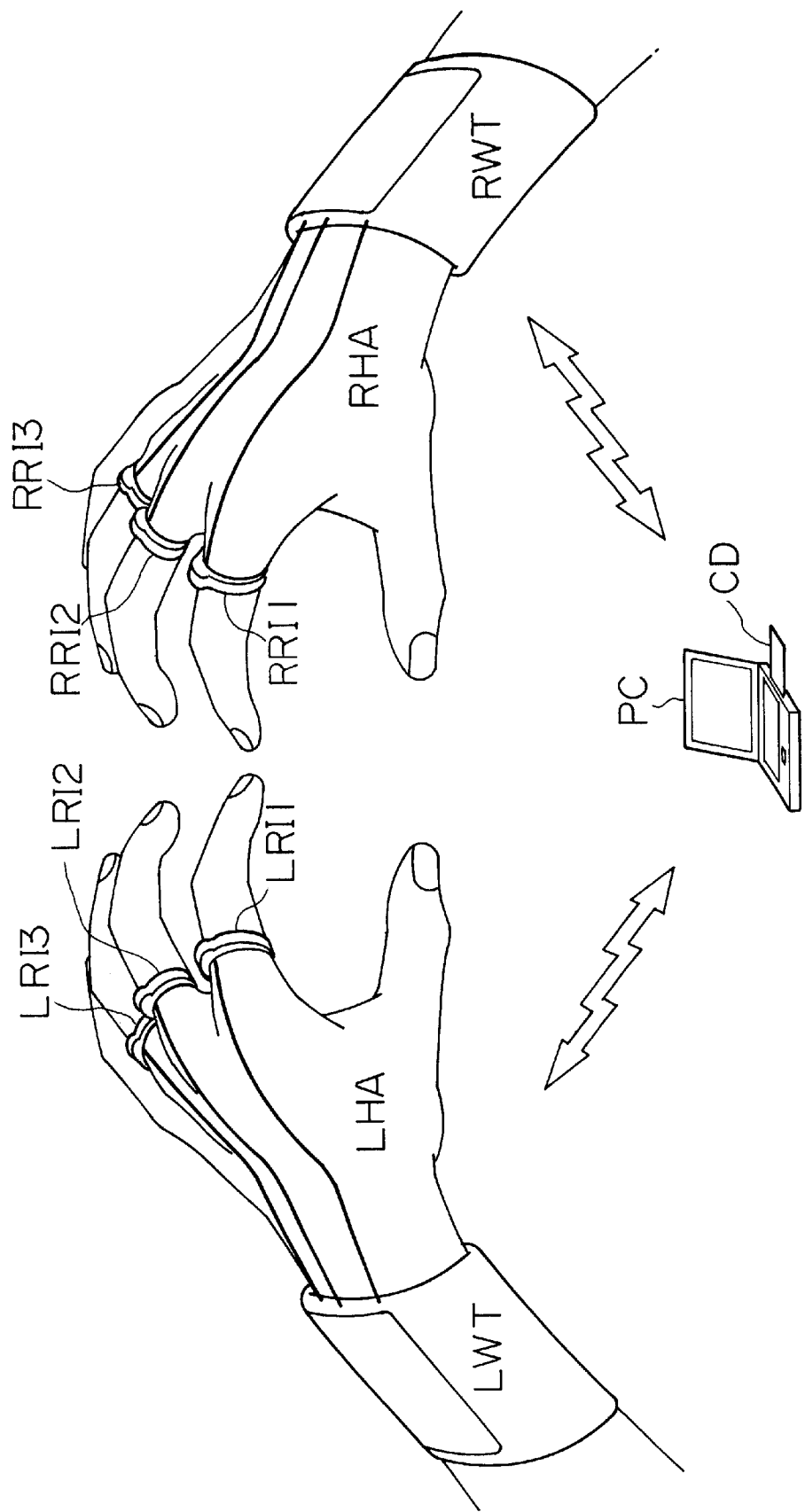
FIG. 37 shows a full-time wearable Braille input/output apparatus according to a Tenth Embodiment of the present invention.
Figure 38:
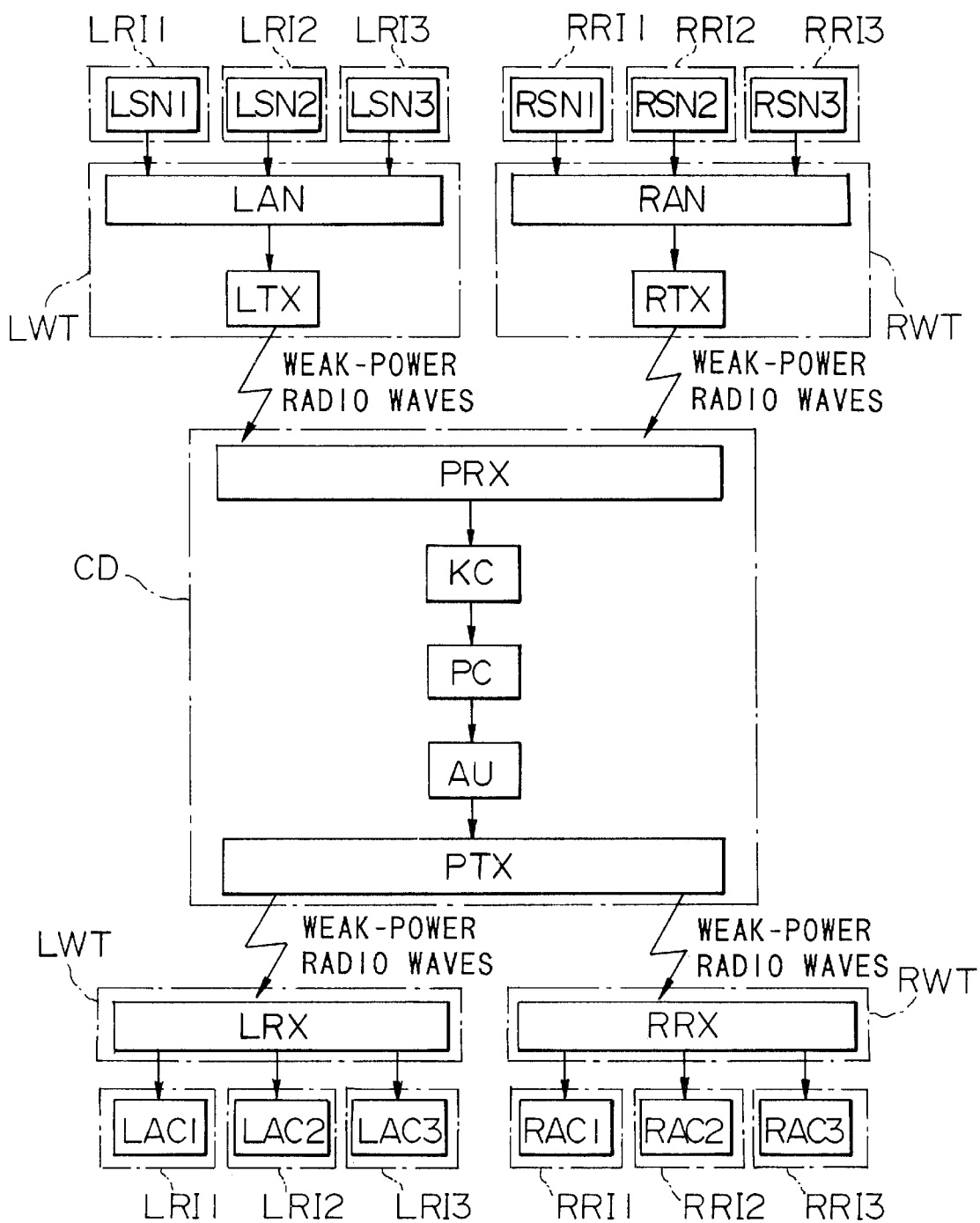
FIG. 38 is a block diagram showing a structural outline of a full-time wearable Braille input/output apparatus according to a Tenth Embodiment of the present invention.

The Tenth Embodiment of the present invention applies a full-time wearable input device as an input device for a full-time wearable Braille keyboard device and a full-time wearable Braille input/output device. FIG. 37 shows a full-time wearable Braille input/output device according to the Tenth Embodiment of the present invention. FIG. 38 is a block diagram showing a structural outline of the full-time wearable Braille input/output device according to the Tenth Embodiment.

In FIGS. 37 and 38, a right hand RHA; left hand LHA; finger-ring-type sensor modules RRI1~RRI3 and LRI1~LRI3; sensors RSN1~RSN3 and LSN1~LSN3; actuators RAC1~RAC3 and LAC1~LAC3; weak power radio wave transmitters RTX, LTX, and PTX; wireless receivers RRX, LRX, PRX; preprocessors LAN and RAN; wristwatch-style bands RWT and LWT; keycode analyzer KC; actuator analyzer AU; information processing apparatus PC; and an extension card CD such as a PCMCIA standard are provided.

In the inner portions of finger-ring-type sensor modules RRI1~RRI3 and LRI1~LRI3, sensors RSN1~RSN3 and LSN1~LSN3, and actuators RAC1~RAC3 and LAC1~LAC3 are respectively provided. Wristwatch-style bands RWT and LWT are worn around the wrist portions, and include in the inner portions therein weak-power radio wave transmitters RTX and LTX; wireless receivers RRX and LRX; and preprocessors LAN and RAN, respectively. Furthermore, although not shown in the Figs., a power module such as a battery or the like is built into each of finger-ring-type sensor modules RRI1~RRI3, LRI1~LRI3, wristwatch-style bands RWT, LWT, as an electrical power source. In addition, keycode analyzer KC, actuator analyzer AU, weak-power radio wave transmitter PTX, and wireless receiver PRX are contained in extension card CD. It is possible to store a portable information processing apparatus PC into which the aforementioned extension card CD can be installed in a pocket, bag, or the like. Furthermore, it is also possible to package either keyboard analyzer KC, actuator analyzer AU, or information processing apparatus PC in wristwatch-style band RWT or LWT. In this case, the internally provided weak-power radio wave transmitter and wireless receiver RTX or LTX become unnecessary.

In addition, as the input device of the Tenth Embodiment, it is possible to employ any of the full-time wearable input devices disclosed in the aforementioned First through Seventh Embodiments. According to the Tenth Embodiment of the present invention, shock sensors are used as sensors RSN1~RSN3 and LSN1~LSN3. These sensors RSN1~RSN3 and LSN1~LSN3, which are worn around each finger, detect shocks generated at the time of finger-typing on any available physical surface such as a wall, floor, thigh, or the like. The detected shocks are then converted into pulse series by means of preprocessors LAN and RAN, and transmitted from weak-power radio wave transmitters RTX and LTX to wireless receivers PRX using weak-power radio waves. Following this, the pulse series sent out from both hands are converted to input characters by means of keycode analyzer KC and then sent to information processing apparatus PC. The output from information processing apparatus PC is then converted into action-pulse series of actuators LAC1~LAC3 and RAC1~RAC3 of both hands by means of actuator analyzer AU, and then sent to wireless receivers RRX and LRX of both hands using weak-power radio waves. Actuators LAC1~LAC3 and RAC1~RAC3 then are fractionally moved in accordance with the actuator action pulses received by means of the wireless receivers RRX and LRX of both hands. This tactile sensation is then fed back to each finger. The user conducts input of sentences as well as menu selection by means of key input using key-typing. The processing result indication whether the sentences are correctly inputted can be learned from the tactile sensation sent by the actuators LAC1~LAC3 and RAC1~RAC3. Since the characterization regulations for the key-typing are the same as in a six-point Braille system, sight-impaired users who have already learned this system can operate the full-time wearable Braille input/output device according to the Tenth Embodiment without having to receive any special training. In addition, similarly, by means of setting the action regulations of actuators LAC1~LAC3 and RAC1~RAC3 to the same six-point Braille system, it is possible for speech and sight impaired users who have previously learned the same system (speech-, hearing-, and sight-impaired persons) to operate the full-time wearable Braille input/output device of the Tenth Embodiment without having to undergo any special training.

Furthermore, in the case when rings are worn on eight fingers, it is possible to employ an eight-point Braille system and/or a six-point Braille system in which the thumbs are assigned to function keys. In addition, it is also possible to use only the key input portion according to the Tenth Embodiment; however, in this case, it is necessary to jointly use a speech feedback procedure or the like. According to the present embodiment, particularly effective results are generated in the case when the aforementioned device is used by sight-, hearing-, and/or speech-impaired persons; however, obviously, it is also possible for persons without such impairments to use the device as a full-time wearable input/output device. Furthermore, the combinations of fingers wearing the rings, the number of rings, as well as character rules of the key-typing can be freely determined and is not limited to just that disclosed in the Tenth Embodiment.

In the aforementioned, the present invention has been described in detail based on the above embodiments; however, the present invention is not just limited to the aforementioned embodiments, as various modifications are possible so long as the integrity of the essential components are maintained.

What is claimed is:

1. A full-time wearable input device for generating input information associated with striking a physical surface with fingertips, said full-time wearable input device comprising:
   a shock detecting means, positioned at the base of a finger, for detecting a shock generated and transmitted through the finger when the fingertip of the finger strikes the physical surface, and for outputting a detection signal including a predetermined frequency component generated when the fingertip of the finger mounted with said shock detecting means strikes the physical surface; and
   an analyzing means for analyzing a presence or absence of the predetermined frequency component and timing information of the fingertip striking the physical surface, the analysis based on the detection signal outputted from said shock detecting means, and for determining input information.

2. A full-time wearable input device according to claim 1, wherein said shock detecting means comprises:
   an acceleration sensor possessing a resonance frequency conforming to a frequency component of a specific acceleration to be detected.

3. A full-time wearable input device according to claim 1, wherein said shock detecting means comprises:
   a first acceleration sensor possessing a resonance frequency conforming to a frequency component of a specific acceleration to be detected;
   a second acceleration sensor possessing a uniform sensitivity with respect to a frequency band of all detectable accelerations; and
   a processing means for processing respective signals outputted from said first acceleration sensor and said second acceleration sensor, and for detecting only said frequency component of the specific acceleration.

4. A full-time wearable input device according to claim 1, wherein said shock detecting means comprises:
   an acceleration sensor;
   a vibration applying means for vibrating said acceleration sensor; and
   a processing means for regulating said vibration applying means, processing a detection signal outputted from said acceleration sensor, and detecting only a frequency component of a specific acceleration to be detected.

5. A full-time wearable input device according to claim 1, wherein said shock detecting means comprises:
   a myoelectric signal sensor for detecting changes in myoelectric potential at the time of striking said physical surface with the fingertip.

6. A full-time wearable input device according to claim 1, wherein said shock detecting means comprises:
   a plurality of shock sensors for use in detection.

7. A full-time wearable input device according to claim 1, wherein
   said shock detecting means detects shocks generated at the time of striking said physical surface with the fingertips of a plurality of fingers; and
   said analyzing means determines the input information by analyzing the timing information of said plurality of fingertips striking said physical surface based on the strength or the characteristics of a frequency distribution of each detection signal outputted by said shock detecting means.

8. A full-time wearable input device according to claim 1, wherein
   said shock detecting means comprises a plurality of detection sensors for detecting shocks generated at the time of striking said physical surface with the fingertips of a plurality of fingers; and
   said analyzing means determines said input information by analyzing the timing information of said plurality of fingers striking said physical surface based on a time difference between each detection signal outputted by said detection sensor or positional information of said each detection sensor.

9. A full-time wearable input device according to claim 1, wherein said analyzing means determines said input information based on information outputted from said shock detecting means regarding which finger struck said physical surface, which combination of fingers struck said physical surface, or from the order in which the fingers (or combinations therein) struck said physical surface over a short period of time.

10. A full-time wearable input device according claim 1, further comprising a transmitting means for transmitting a detection signal outputted from said shock detecting means to said analyzing means by electromagnetic waves or sound waves.

11. A full-time wearable communication apparatus comprising:
- a full-time wearable input device according to one of claims 2–4, 5–7,8–10, 16, or 1;
- a sentence constructing means for constructing sentences based on input information outputted by said full-time wearable input device;
- a voice synthesizer for converting sentences constructed by means of said sentence constructing means into speech information; and
- a loud speaker for vocalizing based on said speech information outputted by means of said speech synthesizer.

12. A full-time wearable musical keyboard apparatus comprising:
- a full-time wearable input device according to one of claims 2–4, 5–7, 8–10, 16, or 1;
- a music processor for forming a musical tone signal based on input information outputted by said full-time wearable input device; and
- a music generating means for generating musical tones corresponding to said musical tone signal formed by means of said music processor.

13. A full-time wearable Braille keyboard device comprising:
- a full-time wearable input device according to one of claims 2–4, 5–7,8–10, 16, or 1; and
- a Braille input device fore converting input information outputted by means of said full-time wearable input device into Braille input information, and outputting said Braille input information.

14. A full-time wearable Braille input/output device comprising:
- a full-time wearable Braille keyboard device according to claim 16;
- a Braille conversion device for converting information such as characters and figures into a Braille format; and
- a tactile feedback device for transmitting said Braille input information outputted by means of said full-time wearable Braille keyboard device or said Braille conversion device to each finger, hand or wrist.

15. A full-time wearable input device according to claim 1, wherein the shock detecting means has the shape of a finger ring.

16. A full-time wearable input device according to claim 1, wherein the detection signal is transmitted wirelessly from the shock detecting means to the analyzing means.

17. A full-time wearable input device according to claim 1, wherein the input information is language information.

18. A full-time wearable input device according to claim 1, wherein:
- said shock detecting means comprises a plurality of shock sensors, positioned at each base of a plurality of fingers, each shock sensor for detecting the shock generated when the fingertip of each finger corresponding to each shock sensor strikes the physical surface, and for outputting a detection signal including a predetermined frequency component generated when the fingertip of the finger mounted with said shock sensor strikes the physical surface; and
- said analyzing means determines the input information by analyzing the presence or absence of the predetermined frequency component corresponding to each finger and timing information of each fingertip striking the physical surface, the analysis based on the detection signal outputted from the corresponding shock sensor.

19. An information input method for generating input information by striking a fingertip against a physical surface, said information input method comprising:
- a first step of detecting a shock at the base of a finger, the shock generated and transmitted through the finger when the fingertip of the finger strikes the physical surface, and outputting a detection signal when the shock includes a predetermined frequency component which is generated when the fingertip of the finger strikes the physical surface; and
- a second step of analyzing timing information of the fingertip striking the physical surface, the analysis based on the detection signal outputted in the first step, and determining input information.

* * * * *

UNITED STATES PATENT AND TRADEMARK OFFICE
CERTIFICATE OF CORRECTION

PATENT NO. : 6,380,923 B1
DATED : April 30, 2002
INVENTOR(S) : Fukumoto et al.

It is certified that error appears in the above-identified patent and that said Letters Patent is hereby corrected as shown below:

<u>Column 25,</u>
Line 35, "fore" should read -- for --.
Line 42, "claim 16" should read -- claim 13 --.

Signed and Sealed this

Tenth Day of December, 2002

JAMES E. ROGAN
*Director of the United States Patent and Trademark Office*